(12) United States Patent
Kimura et al.

(10) Patent No.: US 10,801,378 B2
(45) Date of Patent: Oct. 13, 2020

(54) ENGINE DEVICE

(71) Applicant: Yanmar Co., Ltd., Osaka-shi, Osaka-fu (JP)

(72) Inventors: Tomoyuki Kimura, Osaka (JP); Hisato Inokuchi, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/096,225

(22) PCT Filed: Mar. 29, 2017

(86) PCT No.: PCT/JP2017/012970
§ 371 (c)(1),
(2) Date: Oct. 24, 2018

(87) PCT Pub. No.: WO2017/187872
PCT Pub. Date: Nov. 2, 2017

(65) Prior Publication Data
US 2019/0145296 A1 May 16, 2019

(30) Foreign Application Priority Data

Apr. 26, 2016 (JP) .................................. 2016-088489
Apr. 26, 2016 (JP) .................................. 2016-088490
(Continued)

(51) Int. Cl.
*F01M 13/04* (2006.01)
*F02B 39/14* (2006.01)
(Continued)

(52) U.S. Cl.
CPC .......... *F01M 13/0416* (2013.01); *F01M 9/10* (2013.01); *F01M 11/02* (2013.01);
(Continued)

(58) Field of Classification Search
CPC .... F01M 13/0416; F01M 11/02; F01M 13/04; F01M 13/00; F01M 9/10;
(Continued)

(56) References Cited

U.S. PATENT DOCUMENTS

2002/0000224 A1* 1/2002 Tscherne ................... F01B 1/12
123/572
2004/0244785 A1 12/2004 Nishikawa et al.
(Continued)

FOREIGN PATENT DOCUMENTS

DE 202012009863 U1 1/2014
JP 1987-029409 U 2/1987
(Continued)

OTHER PUBLICATIONS

International Search Report dated Jun. 20, 2017 issued in corresponding PCT Application PCT/JP2017/012970.
(Continued)

*Primary Examiner* — Hoang M Nguyen
(74) *Attorney, Agent, or Firm* — Norton Rose Fulbright US LLP

(57) ABSTRACT

An engine including: an exhaust manifold provided near one side surface of an engine; a turbocharger having an exhaust-side inlet connected to the exhaust manifold; and a rocker-arm-chamber-integrated intake manifold disposed on a cylinder head and integrally including a rocker arm chamber and an intake manifold. The intake manifold has a wall dividing the rocker arm chamber provided near one side surface of the engine and the intake manifold provided near another side surface thereof to isolate the rocker arm chamber and the intake manifold from each other. The rocker arm chamber has, in its upper portion, a positive crankcase ventilation device protruding therefrom and returning blowby gas to an intake system. The positive crankcase
(Continued)

ventilation device has a blowby-gas discharge port connected with a gas conduit through which blowby gas is delivered to an intake-side inlet of the turbocharger.

20 Claims, 28 Drawing Sheets

(30) Foreign Application Priority Data

| Apr. 26, 2016 | (JP) | ................................ 2016-088491 |
| Apr. 26, 2016 | (JP) | ................................ 2016-088492 |

(51) Int. Cl.
| F02M 25/06 | (2016.01) |
| F02M 35/16 | (2006.01) |
| F01M 9/10 | (2006.01) |
| F02B 37/00 | (2006.01) |
| F01M 13/00 | (2006.01) |
| F02M 35/10 | (2006.01) |
| F02B 67/00 | (2006.01) |
| F01M 11/02 | (2006.01) |
| F01M 13/02 | (2006.01) |
| F02B 37/02 | (2006.01) |
| F02F 7/00 | (2006.01) |
| F02F 1/24 | (2006.01) |

(52) U.S. Cl.
CPC .......... *F01M 13/00* (2013.01); *F01M 13/022* (2013.01); *F01M 13/04* (2013.01); *F02B 37/00* (2013.01); *F02B 37/02* (2013.01); *F02B 39/14* (2013.01); *F02B 67/00* (2013.01); *F02M 25/06* (2013.01); *F02M 35/10* (2013.01); *F02M 35/10222* (2013.01); *F02M 35/10288* (2013.01); *F02M 35/16* (2013.01); *F01M 2011/021* (2013.01); *F01M 2013/027* (2013.01); *F01M 2013/0488* (2013.01); *F02F 1/242* (2013.01); *F02F 7/006* (2013.01); *Y02T 10/144* (2013.01)

(58) Field of Classification Search
CPC ........... F01M 2011/021; F01M 13/022; F01M 2013/0488; F01M 2013/027; F02B 67/00; F02B 37/00; F02B 37/02; F02B 39/14; F02F 1/242; F02F 7/006; Y02T 10/144; F02M 35/10288; F02M 35/10222; F02M 35/10; F02M 35/16; F02M 25/06
USPC .............. 60/605.1–612; 123/41.86, 572–574
See application file for complete search history.

(56) References Cited

U.S. PATENT DOCUMENTS

| 2007/0199321 A1* | 8/2007 | Miura | ................. F02B 29/0462 |
| | | | 60/599 |
| 2009/0194063 A1 | 8/2009 | Rice et al. | |
| 2010/0006075 A1 | 1/2010 | Ruppel et al. | |
| 2013/0112159 A1* | 5/2013 | Lohr | .................. F01M 13/0405 |
| | | | 123/41.86 |
| 2014/0090620 A1* | 4/2014 | Buck | ..................... F02F 7/0031 |
| | | | 123/193.5 |
| 2014/0116403 A1* | 5/2014 | Igarashi | ................. F02B 39/16 |
| | | | 123/559.1 |
| 2014/0366855 A1 | 12/2014 | Kitagawa | |
| 2014/0373821 A1 | 12/2014 | Kitagawa | |

FOREIGN PATENT DOCUMENTS

| JP | 2003-056352 A | 2/2003 |
| JP | 2003-090204 A | 3/2003 |
| JP | 3417116 B2 | 6/2003 |
| JP | 2005-220883 A | 8/2005 |
| JP | 2005-282390 A | 10/2005 |
| JP | 2005-351164 A | 12/2005 |
| JP | 3741890 B2 | 2/2006 |
| JP | 2008-075630 A | 4/2008 |
| JP | 2008-180134 A | 8/2008 |
| JP | 4291940 B2 | 7/2009 |
| JP | 2010-501788 A | 1/2010 |
| JP | 2010-216315 A | 9/2010 |
| JP | 2011-149389 A | 8/2011 |
| JP | 2013-133796 A | 7/2013 |
| JP | 2013-148010 A | 8/2013 |

OTHER PUBLICATIONS

Japanese Office Action dated Sep. 11, 2019 issued in corresponding JP Application 2016-088491.
Search Report dated Jul. 10, 2019 issued in corresponding EP Application 17789161.1 cites the patent documents above.

* cited by examiner

FIG. 20

ENGINE DEVICE

CROSS REFERENCES TO RELATED APPLICATIONS

This application is a national stage application pursuant to 35 U.S.C. § 371 of International Application No. PCT/JP2017/012970, filed on Mar. 29, 2017 which claims priorities under 35 U.S.C. § 119 to Japanese Patent Application No. 2016-088489 filed on Apr. 26, 2016, Japanese Patent Application No. 2016-088490 filed on Apr. 26, 2016, Japanese Patent Application No. 2016-088491 filed on Apr. 26, 2016, and Japanese Patent Application No. 2016-088492 filed on Apr. 26, 2016, the disclosures of which are hereby incorporated by reference in their entireties.

TECHNICAL FIELD

The present invention relates to an engine device provided with a turbocharger.

BACKGROUND ART

A turbocharger for compressing fresh air with exhaust gas energy to increase an air density in a cylinder of the engine has been traditionally mounted in engine devices, for the purpose of enhancement of engine output and improvement of fuel efficiency (see Patent Literature 1 (hereinafter, referred to as PTL 1)). In a case where the turbocharger is mounted in a diesel engine, the turbocharger supplies a large amount of high-pressure air into a cylinder to burn a large amount of fuel. This increases engine output and engine torque, and also facilitates mixing of a fuel and air to suppress or reduce pre-mixed combustion, thereby reducing an amount of nitrogen oxide (NOx) to be emitted.

CITATION LIST

Patent Literature

PTL 1: Japanese Patent Application Laid-Open No. 2008-180134

SUMMARY OF INVENTION

Technical Problem

Incidentally, recently, a space for mounting an engine is often limited (i.e., small) to meet the demands for weight reduction and downsizing, although the space for mounting the engine varies depending on the work vehicle (e.g., a construction machine or an agriculture machine) on which the engine is to be mounted. In view of this, components of the engine need to be arranged compactly. Especially in a case where the turbocharger is mounted in a small-displacement engine, the turbocharger accounts for a large part of a surface of the engine. Therefore, the turbocharger and its related components need to be arranged compactly.

Some aspects of the present invention have a technical object to provide an engine device that has been improved as a result of study of the circumstances described above.

Solution to Problem

An engine device according to an aspect of the present invention includes:

an exhaust manifold disposed at a location close to a first one of left and right side surfaces of the engine device;

a turbocharger having an exhaust-side inlet connected to the exhaust manifold; and a cylinder head cover disposed on an upper surface of a cylinder head, the cylinder head cover integrally including a rocker arm chamber and an intake manifold, wherein the cylinder head cover has a wall dividing the rocker arm chamber disposed at a location close to the first one of the left and right side surfaces of the engine device and the intake manifold disposed at a location close to a second one of the left and right side surfaces of the engine device from each other to isolate the rocker arm chamber and the intake manifold from each other, and the rocker arm chamber has an upper portion provided with a positive crankcase ventilation device which protrudes from the upper portion of the rocker arm chamber and which is configured to return blowby gas to an intake system, the positive crankcase ventilation device has a side surface provided with a blowby-gas discharge port to which a gas conduit is connected, and the blowby gas is delivered to an intake-side inlet of the turbocharger through the gas conduit.

The engine device according to the aspect of the present invention may be configured such that, for example, the intake manifold has an upper surface covered with an intake lid provided with an intake inlet protruding upward from the intake lid, the intake inlet is connected to the intake-side outlet of the turbocharger via an intake relay pipe, and the gas conduit is positioned such that the gas conduit crosses the intake relay pipe at a location below the intake relay pipe.

The engine device according to the aspect of the present invention may be configured such that, for example, the intake-side inlet of the turbocharger is connected to an intake pipe which is curved into an L-shape and which has an upstream-side portion being connected to the gas conduit and being inclined upward, and the gas conduit is inclined upward from the blowby-gas discharge port to a connecting part at which the gas conduit and the intake pipe are connected to each other.

The engine device according to the aspect of the present invention may be configured such that, for example, a gas introduction part, which is configured to introduce blowby gas in the rocker arm chamber upward into the positive crankcase ventilation device, is inserted into the rocker arm chamber, and an inner passage between a gas outlet of the gas introduction part and a gas discharge part communicating with the blowby-gas discharge port has a labyrinth structure.

The engine device according to the aspect of the present invention may be configured such that, for example, the positive crankcase ventilation device includes a dividing wall which is disposed away from a peripheral wall of the positive crankcase ventilation device and which divides, from the inner passage, a gas introduction chamber to which the gas outlet of the gas introduction part is inserted, and an oil trap material is provided between the peripheral wall and the dividing wall to allow the oil trap material to be interposed between the gas outlet of the gas introduction part and the inner passage.

The engine device according to the aspect of the present invention may be configured such that, for example, a beam-shaped dividing wall is provided in a suspended manner at a position between the oil trap material and the gas introduction chamber and above the oil trap material, and the inner passage includes, as a part thereof, a space surrounded by an upper surface of the oil trap material, the beam-shaped dividing wall, and the peripheral wall.

The engine device according to the aspect of the present invention may be configured such that, for example, the turbocharger is positioned above the exhaust manifold, and the turbocharger is supplied with lubrication oil through an oil feeding pipe, the oil feeding pipe being installed such that the oil feeding pipe extends from the second one of the left and right side surfaces of the engine device toward the first one of the left and right side surfaces of the engine device, while making a detour by extending along a first one of front and rear side surfaces of the engine device, and the oil feeding pipe further extends, over the first one of the left and right side surfaces of the engine device, from a first one of front and rear side surfaces of the exhaust manifold toward a position above the exhaust manifold, while making a detour by extending along an outer periphery of the exhaust manifold.

The engine device according to the aspect of the present invention may be configured such that, for example, an injector is inserted into the cylinder head, and is supplied with fuel from a fuel injection pump device, the fuel injection pump device has front and rear ends, a first one of which is provided with an electronically-controlled speed-governing mechanism, the first one of the front and rear ends of the fuel injection pump device is fixed to a second one of left and right side surfaces of the cylinder head via a fixing bracket, and a second one of the front and rear ends of the fuel injection pump device is fixed to a gear case attached to a cylinder block, and the injector is placed in a recess in the intake manifold, which is mounted on the upper surface of the cylinder head, and the injector is connected to the fuel injection pump device through a fuel pipe.

The engine device according to the aspect of the present invention may be configured such that, for example, the intake-side inlet of the turbocharger is positioned to face a first one of front and rear side surfaces of the engine device, and an intake pipe, which is curved into an L-shape, has
a downstream-side portion being positioned along a front-and-rear direction of the engine device and being connected to the intake-side inlet of the turbocharger, and
an upstream-side portion being positioned along a left-and-right direction of the engine device and extending toward the second one of the left and right side surfaces of the engine device.

Advantageous Effects of Invention

The engine device according to the aspect of the present invention is configured to include the cylinder head cover disposed on the upper surface of the cylinder head, the cylinder head cover integrally including the rocker arm chamber and the intake manifold, wherein the rocker arm chamber has the upper portion provided with the positive crankcase ventilation device protruding therefrom, the positive crankcase ventilation device has the side surface provided with the blowby-gas discharge port to which the gas conduit is connected, and blowby gas is delivered to the intake-side inlet of the turbocharger through the gas conduit. With the configuration in which the rocker arm chamber and the intake manifold are integrally formed in the cylinder head cover, the rocker arm chamber and the intake manifold can be arranged compactly. With this configuration, the turbocharger and the positive crankcase ventilation device, which is disposed above the rocker arm chamber, can be arranged close to each other, and thus can also be arranged compactly. With the configuration in which the blowby-gas discharge port is provided on the side surface of the positive crankcase ventilation device, the gas conduit, which is connected to the blowby-gas discharge port, can be positioned flexibly. With the configuration in which the positive crankcase ventilation device is provided to the upper portion of the rocker arm chamber such that the positive crankcase ventilation device protrudes therefrom, it is possible to prevent a decrease in inner volume of the rocker arm chamber that might be caused by installation of the positive crankcase ventilation device. Consequently, the rocker arm chamber can achieve a volume sufficient to deal with blowby gas increased by installation of the turbocharger, without a significant increase in volume of the rocker arm chamber, hence, without a significant increase in external dimensions of the cylinder head cover. With the configuration in which the blowby-gas discharge port disposed on the side surface of the positive crankcase ventilation device and the turbocharger can be arranged close to each other, it is possible to easily position the gas conduit and to shorten the length of the gas conduit to be installed. With the gas conduit having a shorter length, it is possible to avoid a situation in which the gas conduit is blocked due to freezing, bending, and/or the like that might otherwise occur in the gas conduit. With the configuration in which the gas conduit is disposed directly above the cylinder head cover, it is possible to avoid a situation in which the gas conduit is blocked due to freezing and/or the like that might otherwise occur in the gas conduit, thanks to heat from the engine.

The engine device according to the above-described embodiment may be configured such that the upper surface of the intake manifold is covered with the intake lid to which the intake inlet is connected via the intake-side outlet of the turbocharger and the intake relay pipe, and the gas conduit is positioned such that the gas conduit crosses the intake relay pipe at a location below the intake relay pipe. Thus, the intake relay pipe extends over the gas conduit. With this configuration, the intake relay pipe can be placed away from the cylinder head cover, and thus it is possible to suppress or reduce an increase in temperature of combustion air in the intake relay pipe that might otherwise be caused by heat dissipated from the engine. At the same time, with this configuration, the intake relay pipe and the gas conduit can be placed in a space above the cylinder head cover, and thus this space is effectively utilized.

The engine device according to the above-described embodiment may be configured such that the gas conduit is inclined upward from the blowby-gas discharge port to the connecting part at which the gas conduit and the intake pipe are connected to each other. With this configuration, it is possible to achieve, at a location below the upstream-side portion of the intake pipe, a space for installing another component of the engine, without the need to increase a vertical position of the intake-side inlet of the turbocharger, hence, without the need to increase a vertical position of the turbocharger itself, but with a compact configuration in which a vertical position of the turbocharger is suppressed or reduced. With the above-described configuration, it is possible to provide a large space between the fresh-air inflow port provided in the upstream-side portion of the intake pipe and another component disposed below the fresh-air inflow port. Thus, the space that an operator can access to attach/detach a pipe leading to an air cleaner to/from the fresh-air inflow port of the intake pipe can be achieved. This facilitates the attachment/detachment work. With the configuration in which the gas conduit is inclined upward from the blowby-gas discharge port toward the connecting part at which the gas conduit and the intake pipe are connected to each other, it is possible to prevent a phenomenon that lubrication oil, unburned fuel, and/or the like adhered on the inner wall of the blowby-gas return pipe flows into the intake pipe. This can reduce the possibility that lubrication oil and/or the like may be mixed in combustion air (fresh air) supplied to the engine and the possibility that the passage of the intake system may be stained by lubrication oil and/or the like.

With the engine device according to the above-described the present embodiment, the inner passage between the gas outlet of the gas introduction part through which blowby gas in the rocker arm chamber is introduced into the positive crankcase ventilation device and the gas discharge part communicating with the blowby-gas discharge port may be formed to have a labyrinth structure. Thus, the labyrinth structure formed in the positive crankcase ventilation device, which protrudes from the upper portion of the rocker arm chamber, can be made compact without a significant increase in volume of the rocker arm chamber, hence, without a significant increase in external dimensions of the cylinder head cover. With such a labyrinth structure, it is also possible to remove lubrication oil, unburned fuel, and/or the like contained in blowby gas.

With the configuration in which the oil trap material is provided between the dividing wall dividing, from the inner passage, the gas introduction chamber to which the gas outlet of the gas introduction part is inserted and the peripheral wall of the positive crankcase ventilation device, it is possible to allow blowby gas flowing from the gas outlet of the gas introduction part to the inner passage while going around the dividing wall and to pass through the oil trap material. Consequently, it is possible to remove, with the oil trap material, lubrication oil and/or the like contained in the blowby gas.

With the configuration in which the inner passages includes, as a part thereof, a space surrounded by the beam-shaped dividing wall disposed in a suspended manner at a position between the oil trap material and the gas introduction chamber and above the oil trap material, the upper surface of the oil trap material, and the peripheral wall, it is possible to cause blowby gas to pass through the inside of the oil trap material when the blowby gas flows from the gas outlet of the gas introduction part toward the upper surface of the oil trap material. Consequently, it is possible to remove, with the oil trap material, lubrication oil and/or the like contained in the blowby gas.

In the engine device according to the above-described embodiment, the oil feeding pipe for feeding lubrication oil to the turbocharger, which is positioned above the exhaust manifold, may be installed such that the oil feeding pipe extends from the second one of the left and right side surfaces of the engine toward the first one of the left and right side surfaces of the engine, while making a detour by extending along the first one of the front and rear side surfaces of the engine, and the oil feeding pipe may further extend, over the first one of the left and right side surfaces of the engine, from a first one of front and rear side surfaces of the exhaust manifold toward the position above the exhaust manifold, while making a detour by extending along the outer periphery of the exhaust manifold. With this configuration, it is possible to compactly arrange, along the side surfaces of the engine, the oil feeding pipe for feeding lubrication oil to the turbocharger. In addition, since the oil feeding pipe is installed such that the oil feeding pipe makes a detour by extending along the outer periphery of the exhaust manifold, the oil feeding pipe would not become an obstacle to an attachment work of the exhaust manifold even in a state where the oil feeding pipe is attached to the engine. Thus, this configuration improves efficiency in assembling of the engine.

The engine device according to the above-described embodiment may be configured such that the portion of the fuel injection pump device, which portion is provided with the speed-governing mechanism of the fuel injection pump device, is supported by the cylinder head, which is less affected by vibrations from the engine than is the cylinder block. With this configuration, it is possible to reduce the effects given to the speed-governing mechanism by vibrations from the engine. Accordingly, it is possible to suppress or reduce an erroneous operation of the speed-governing mechanism, thereby making it possible to prevent an excess amount of fuel or an insufficient amount of fuel from being injected. With the configuration in which the injector is placed in the recess in the intake manifold mounted on the upper surface of the cylinder head and the injector is connected to the fuel injection pump device through the fuel pipe, the fuel injection pump device can be positioned close to the injector. Consequently, the length of the fuel pipe can be made shorter. Therefore, a pressure for forcibly feeding fuel from the fuel injection pump device to the injector can be kept at a high pressure. Accordingly, the injector injects fuel with good response, so that a combustion efficiency can be enhanced. Thus, this configuration can improve fuel economy, and can also suppress or reduce generation of graphite and/or NOx.

The engine device according to the aspect described above may be configured such that the upstream-side portion of the intake pipe, which is connected to the intake-side inlet of the turbocharger, is positioned along the left-and-right direction and extends toward the second one of the left and right side surfaces of the engine. With this configuration, it is possible to compactly arrange the intake pipe, which is connected to the turbocharger, without causing the intake pipe to protrude from the first one of the front and rear side surfaces of the engine. For example, even in a case where a space between the intake-side inlet of the turbocharger and engine components (e.g., a cooling fan, a fan shroud, and a radiator) positioned at a location close to the first one of the front and rear side surfaces of the engine is small, the engine device according to the above-described embodiment can achieve a space in which a pipe leading to the air cleaner can be connected to the intake pipe, thanks to the configuration in which the upstream-side portion of the intake pipe extends toward the second one of the left and right side surfaces of the engine.

BRIEF DESCRIPTION OF DRAWINGS

FIG. 20 A left side view of components of an exhaust system.

DESCRIPTION OF EMBODIMENTS

Figure 1:
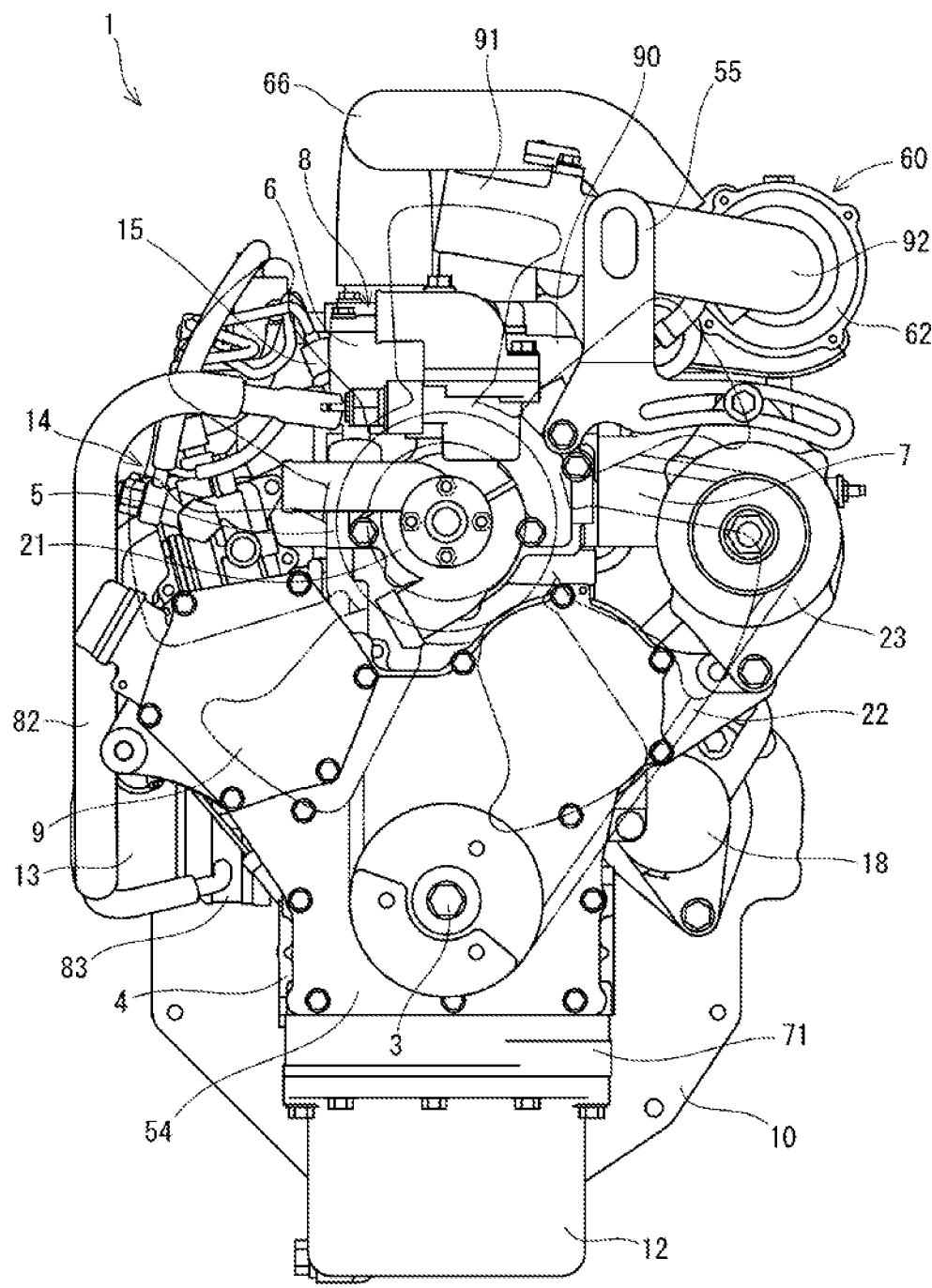
FIG. 1 A front view of an engine.
Figure 2:
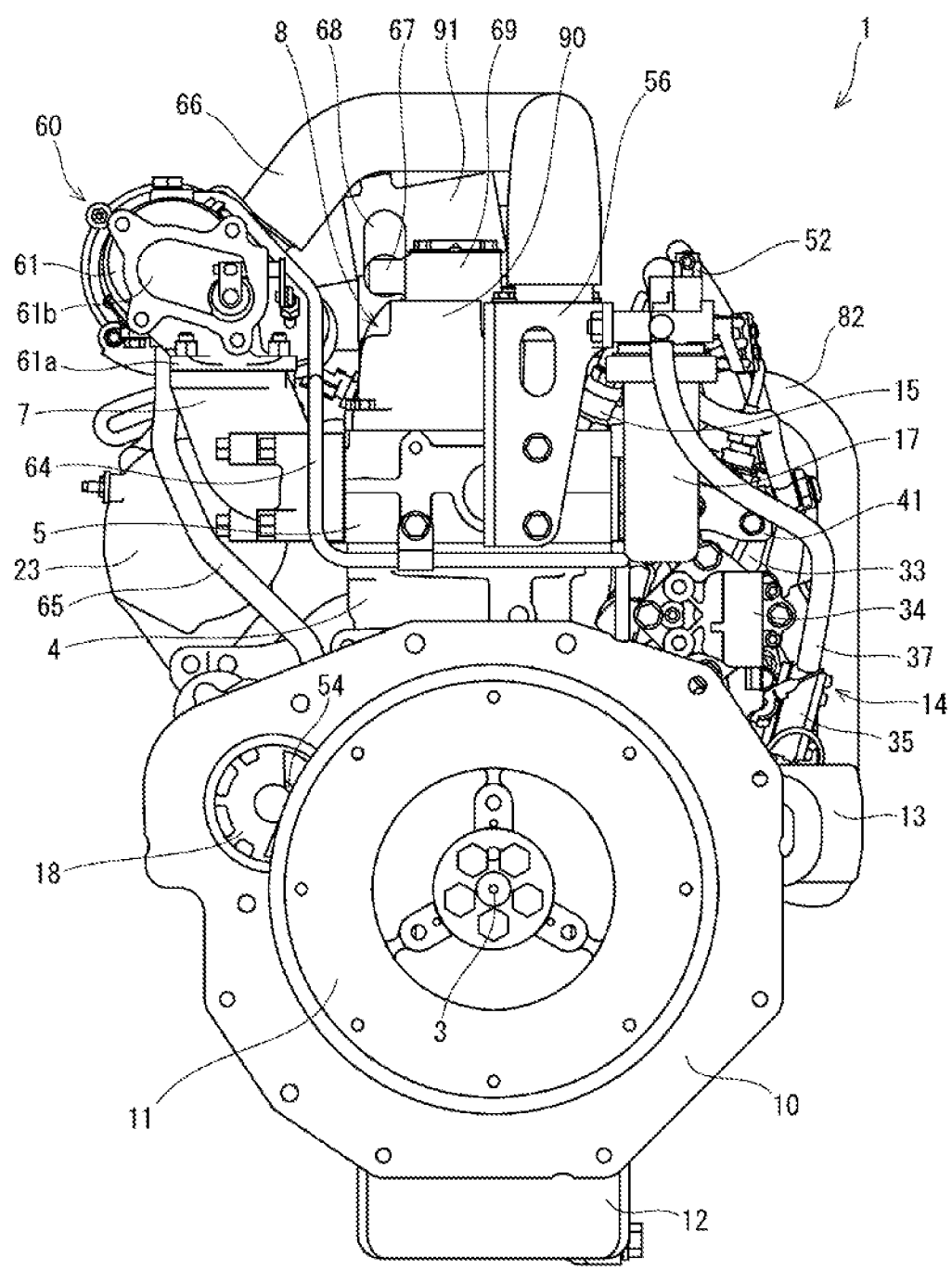
FIG. 2 A back view of the engine.

Next, with reference to the drawings, the following will describe embodiments of the present invention. First, with reference to FIGS. 1 to 7, a configuration of an engine (engine device) 1 will be schematically described. In the following description, two opposed sides along an output shaft 3 (two opposed sides extending along the output shaft 3) are respectively referred to as left and right, a side on which a cooling fan 9 is disposed is referred to as a front side (one side), a side on which a flywheel 11 is disposed is referred to as a rear side, a side on which an exhaust manifold 7 is disposed is referred to as a left side (a first one of the sides), and a side on which a fuel injection pump device 14 is disposed is referred to as a right side (a second one of the sides). Based on these definitions, a positional relation in the engine 1 in four lateral directions and a vertical direction will be described.

As illustrated in FIGS. 1 to 7, the engine 1, which is a prime mover to be mounted in a work machine such as a construction machine or an agriculture machine, has a cylinder block 4 internally including the output shaft 3 (crankshaft) and a piston (not illustrated). On the cylinder block 4, a cylinder head 5 is mounted. The cylinder head 5 has a left side surface adjacent to which the exhaust manifold 7 is disposed. The cylinder head 5 has an upper surface on which a rocker-arm-chamber-integrated intake manifold 8 (cylinder head cover) is disposed. The rocker-arm-chamber-integrated intake manifold 8 includes an intake manifold part 6 and a rocker arm chamber part 90. The intake manifold part 6 is disposed in a right-side portion of the intake manifold 8, and extends in a front-and-rear direction. The rocker arm chamber part 90 is disposed in a left-side portion of the intake manifold 8, and extends in the front-and-rear direction. Namely, above the cylinder head 5, the intake manifold part 6 is disposed on the right side relative to the output shaft 3 of the engine 1, and the rocker arm chamber part 90 is disposed on the left side (close to the exhaust manifold 7) relative to the output shaft 3 of the engine 1. The rocker arm chamber part 90 covers an intake valve (not illustrated), an exhaust valve (not illustrated), and other components provided in a portion of the cylinder head 5, the portion being close to the upper surface.

The engine 1 is provided with the cooling fan 9, which is disposed at a location close to one side surface of the engine 1 intersecting with the output shaft 3, specifically, at a location close to a front surface of the cylinder block 4. A mounting plate 10 is provided at a location close to a rear surface of the cylinder block 4. A flywheel 11 is disposed such that the flywheel 11 overlaps the mounting plate 10. The flywheel 11 is pivotally supported by the output shaft 3. Via the output shaft 3, driving power of the engine 1 is supplied to a work unit of a work machine. Below the cylinder block 4, an oil pan 12 is disposed. Lubrication oil in the oil pan 12 is supplied to lubricated parts (parts to be lubricated) of the engine 1 via an oil filter 13 disposed at a location close to a right side surface of the cylinder block 4. The oil pan 12 is connected to the cylinder block 4 via a spacer 71. The spacer 71 extends from a rear end of the cylinder block 4 to a position below a gear case 54. The gear case 54, which is connected to the front surface of the cylinder block 4, is connected also to the spacer 71.

Injectors (fuel injection valves) 15 are provided in a right portion of the upper surface of the cylinder head 5. In the example of the present embodiment, the injectors 15 for three cylinders are provided. The following description of the example of the present embodiment will deal with the engine 1 with three cylinders. However, the number of cylinders in the engine device of the present invention is not limited to three. The injectors 15 are connected to a fuel tank (not illustrated) in a work machine via a fuel injection pump device 14 and a fuel filter 17. The cylinder head 5 has a front surface having a left portion to which a proximal end of a front suspended metal fitting 55 is fastened by a bolt. The front suspended metal fitting 55 serves also as a support member for an alternator 23 (described later).

The fuel injection pump device 14 is attached to a portion of the right side surface of the cylinder block 4, the portion being higher than the oil filter 13 (lower than the intake manifold part 6). The fuel injection pump device 14 is configured to supply fuel into combustion chambers in the cylinder block 4 via the injectors 15. The fuel injection pump device 14 includes an injection pump body 32 for supplying fuel to the injectors 15 via fuel injection pipes 36, a governor storage case 33 in which a governor for adjusting an amount of fuel to be injected (fuel injection amount) is accommodated, an actuator 34 for controlling operation of the governor, and a fuel feeding pump 35 for feeding fuel.

Figure 27:
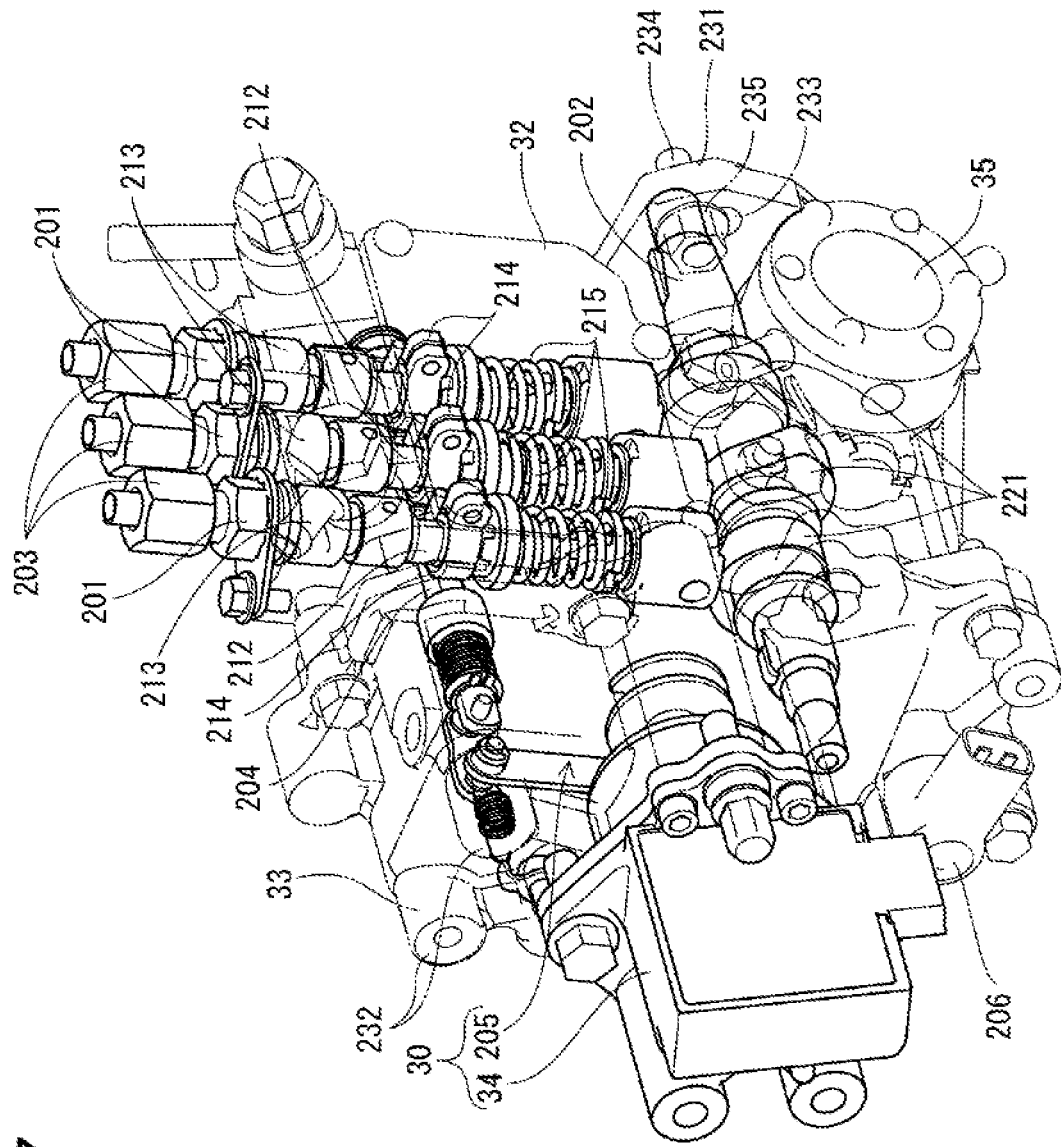
FIG. 27 A perspective view illustrating the configuration of the fuel injection pump device.
Figure 28:
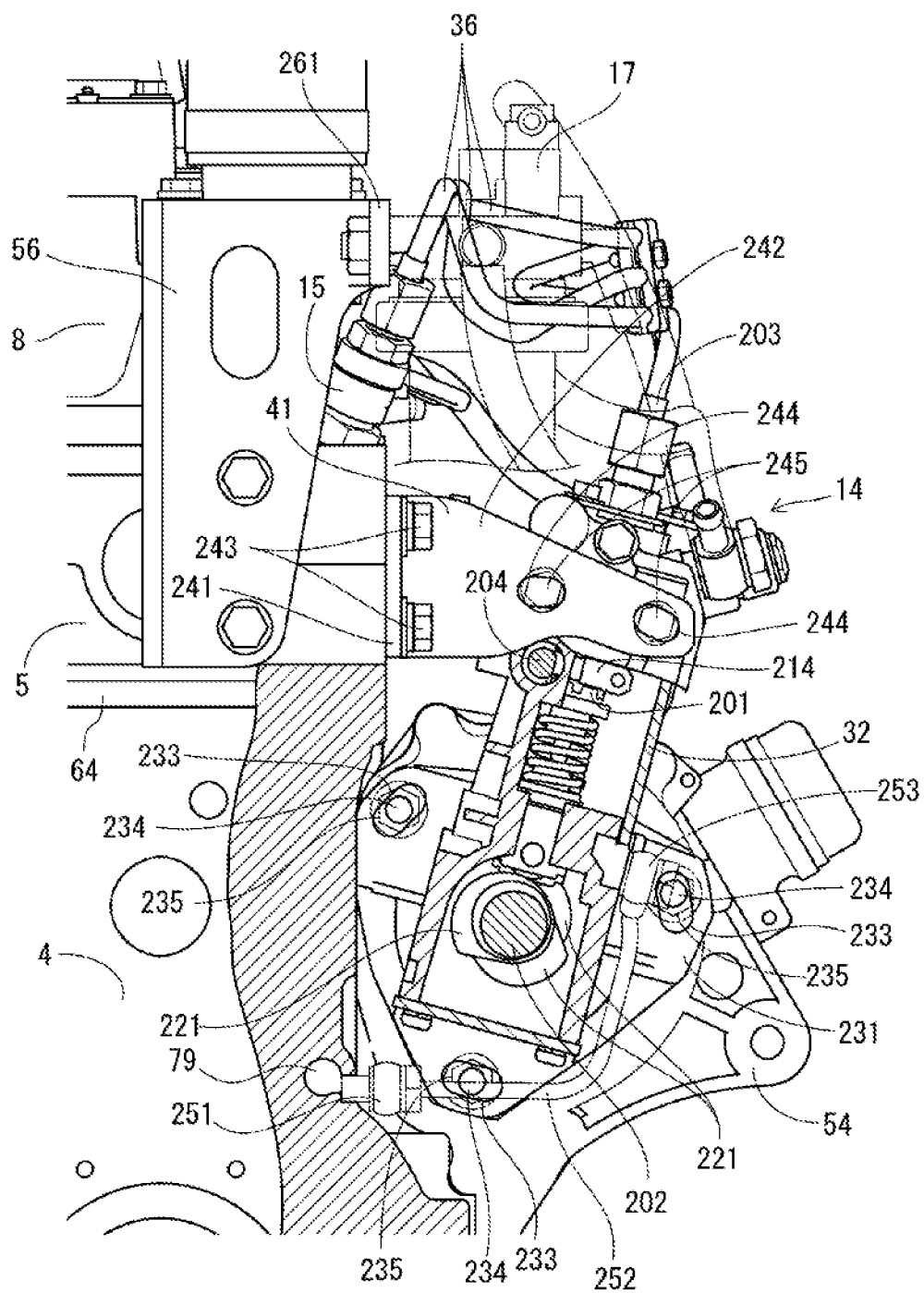
FIG. 28 A partial cross-sectional view of a cylinder block and the fuel injection pump device, viewed from the back side of the engine.

In the fuel injection pump device 14, the governor storage case 33 is detachably fastened by a bolt to a rear surface of the injection pump body 32. The actuator 34 is detachably fastened by a bolt to a rear surface of the governor storage case 33. The fuel feeding pump 35 is detachably fastened by a bolt to a lower portion of a right side surface of the injection pump body 32. The governor storage case 33 includes, in its inside, a speed-governing linkage 205 (described later, see FIG. 27). The speed-governing linkage 205 and the actuator 34 constitute a speed-governing mechanism 30.

The injection pump body 32 has a front surface detachably fastened by a bolt to a rear surface of the gear case 54, and the governor storage case 33 has a rear surface detachably fastened by a bolt to a rear portion of a right side surface of the cylinder head 5 via a fixing bracket 41 having an L-shape. In this manner, the fuel injection pump device 14 is attached to the engine 1. The gear case 54, which is attached to a lower portion of the front surface of the cylinder block 4, accommodates a gear train including gears such as a crank gear, a cam gear, a pump gear, and an idle gear (not illustrated).

When the fuel feed pump 35 is driven, fuel in the fuel tank (not illustrated) is sent from the fuel feeding pump 35 to the injection pump body 32 through a fuel feeding pipe 37, the fuel filter 17, and a fuel relay pipe 38. Then, the fuel is supplied from the injection pump body 32 to the injectors 15 via the respective fuel injection pipes 36. Between the injection pump body 32 and the fuel filter 17, a fuel return pipe 39 is connected. At a location near the injection pump body 32, the fuel return pipe 39 is merged with a fuel return pipe 40 for returning excess fuel from the injectors 15. The excess fuel from the engine 1 is returned to the fuel tank (not illustrated) through the fuel return pipes 39 and 40, a fuel return pipe joint 57 provided above the fuel filter 17, and the like. The cylinder head 5 has a rear surface including a right portion to which a proximal end of a rear suspended metal fitting 56 is fastened by a bolt. The fuel filter 17, which is disposed adjacent to an upper portion of a right side surface of the rear suspended metal fitting 56, is detachably fastened by a bolt.

The mounting plate 10 is provided with a starter 18 for engine start. The starter 18 for engine start includes a pinion gear that is engaged with a ring gear of the flywheel 11. In order to start the engine 1, rotational power of the starter 18 for engine start causes the ring gear of the flywheel 11 to rotate, so that the output shaft 3 is caused to start rotating (so-called "cranking" is performed).

In the vicinity of the front surface of the cylinder head 5 (in the vicinity of the cooling fan 9), a coolant pump 21 is disposed coaxially with a fan axis of the cooling fan 9. On the left side of the engine 1, specifically, on the left side of the coolant pump 21, the alternator 23 is provided. The alternator 23 is an electricity generator configured to generate electricity by driving power from the engine 1. By rotation of the output shaft 3, the cooling fan 9 as well as the coolant pump 21 and the alternator 23 are driven by a V-belt 22 for driving the cooling fan. When the coolant pump 21 is driven, coolant in a radiator 19, which is mounted in the work machine, is supplied into the cylinder block 4 and the cylinder head 5. Consequently, the engine 1 is cooled. The coolant from the coolant pump 21 is partially caused to flow to an oil cooler 83, which is disposed at the base of the oil filter 13, via a passage inside the cylinder block 4 and coolant relay pipes 81 and 82.

Figure 3:
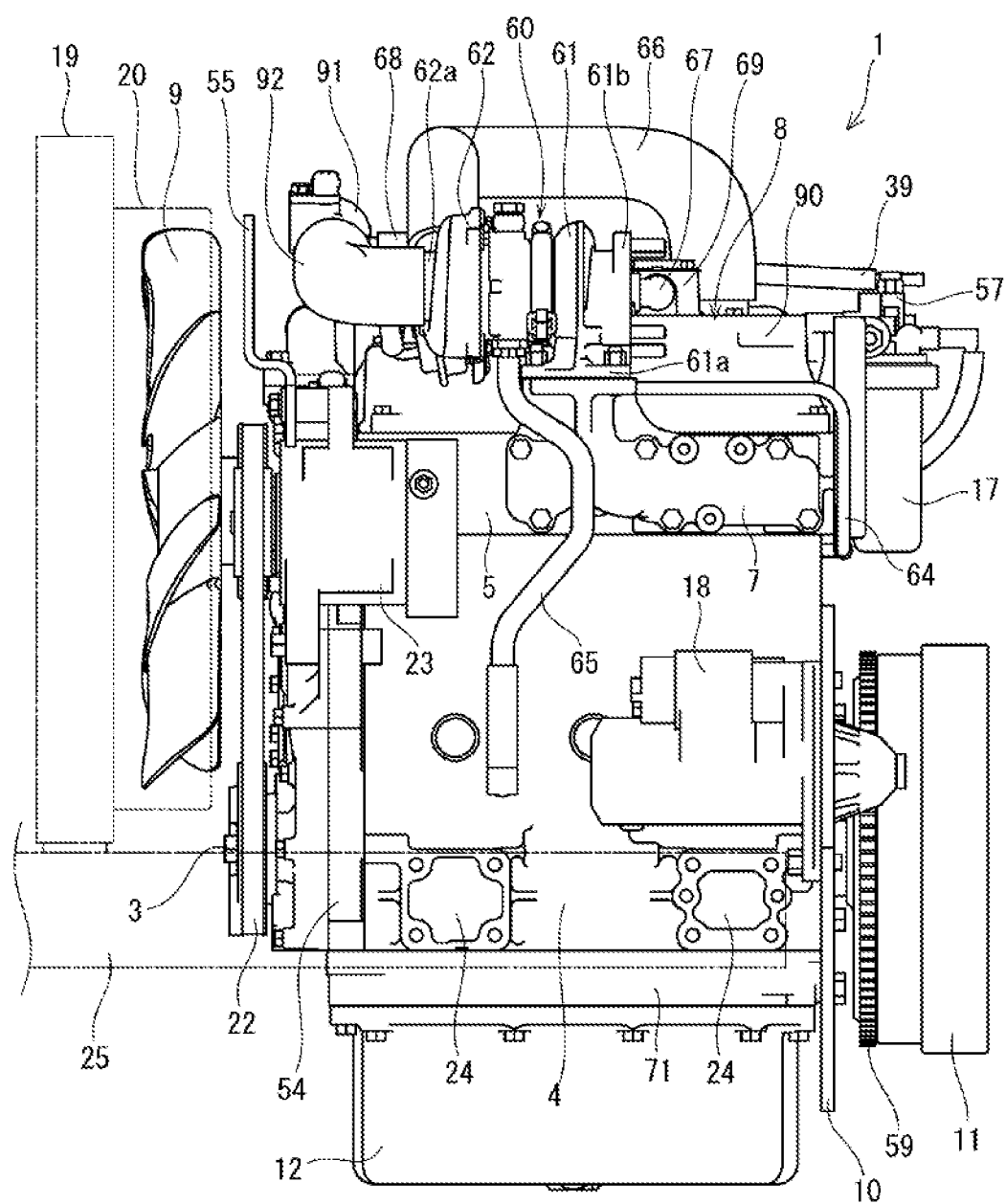
FIG. 3 A left side view of the engine.
Figure 4:
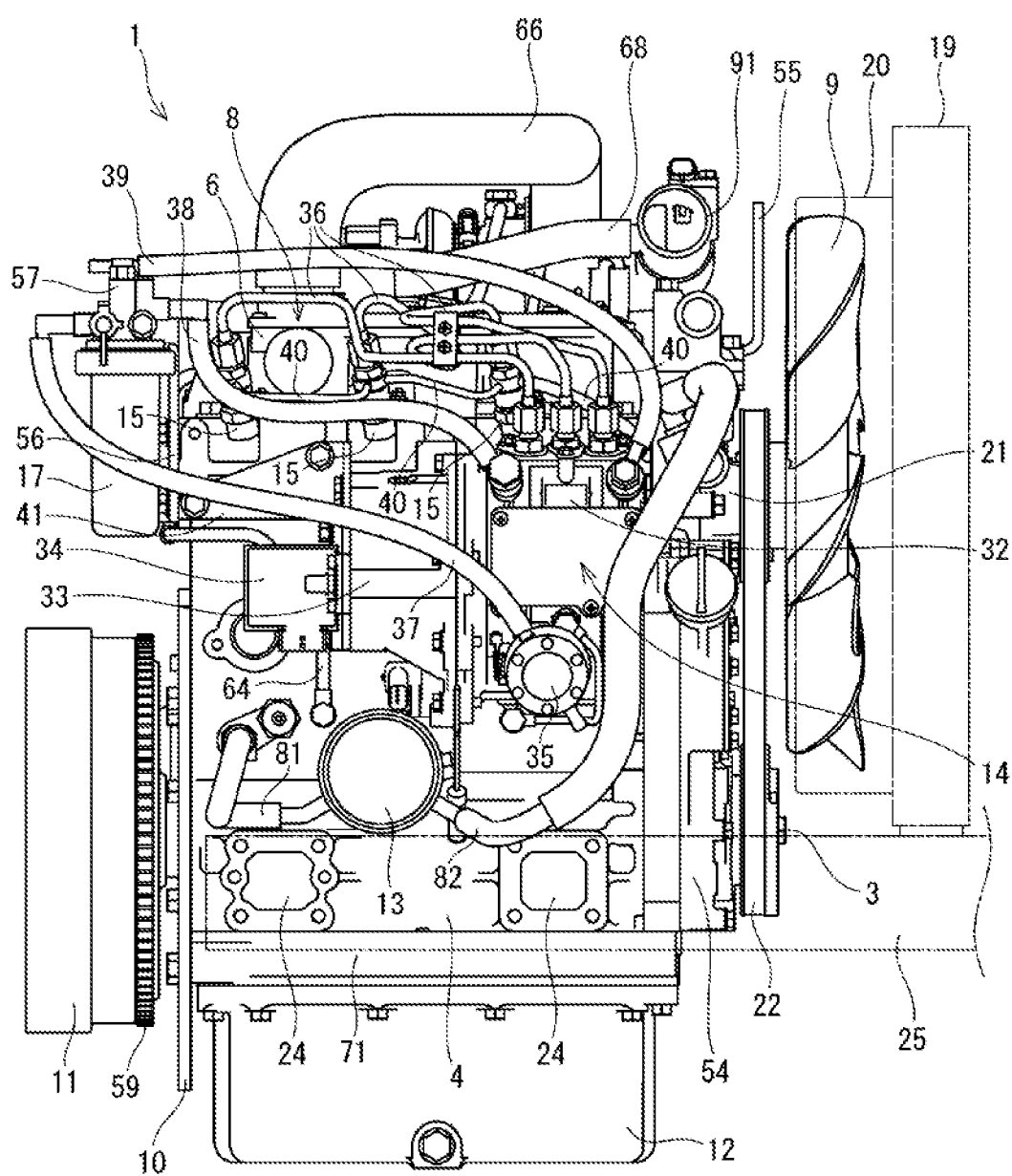
FIG. 4 A right side view of the engine.
Figure 5:
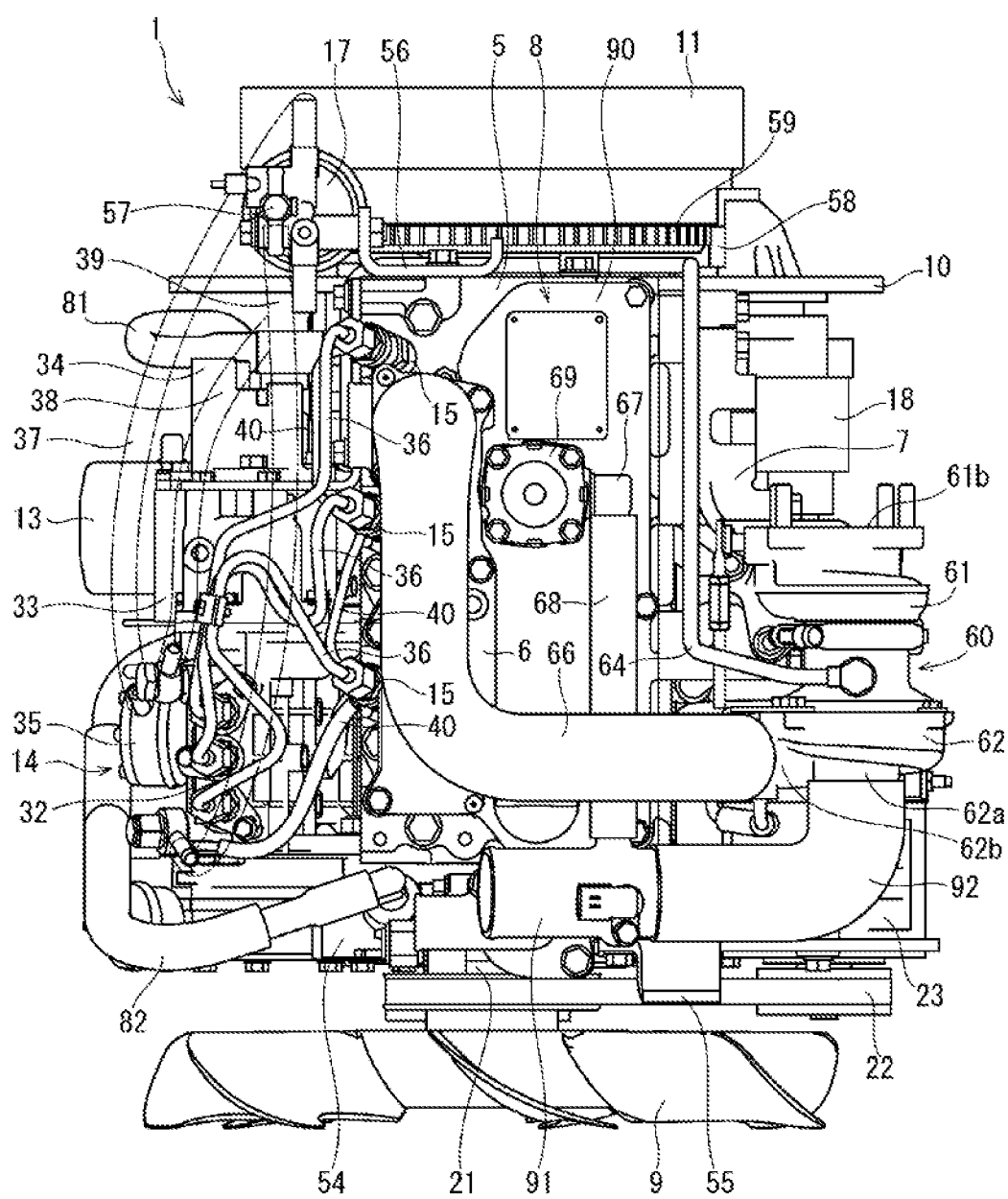
FIG. 5 A plan view of the engine.
Figure 6:
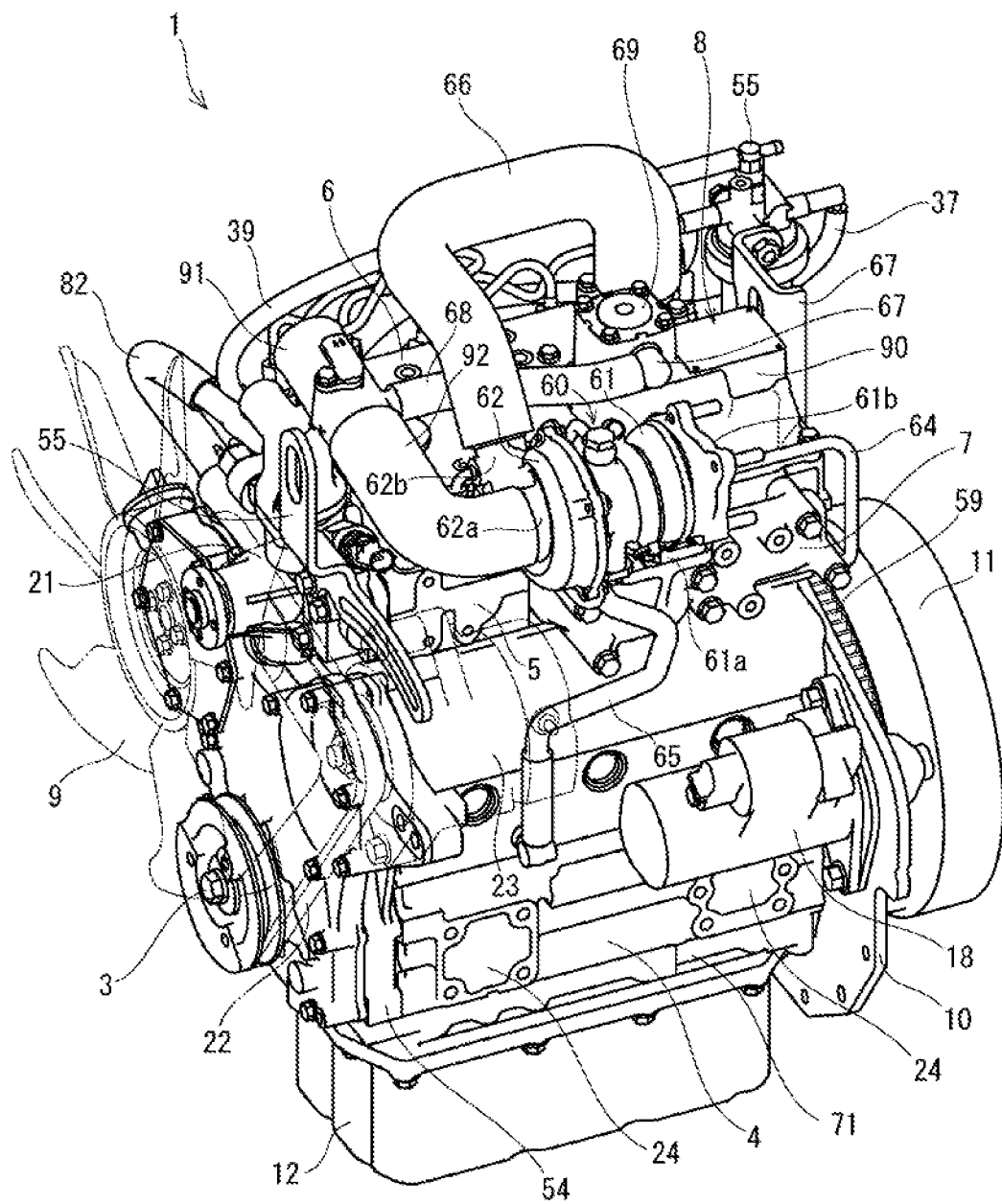
FIG. 6 A perspective view of the engine, seen diagonally from the front.
Figure 7:
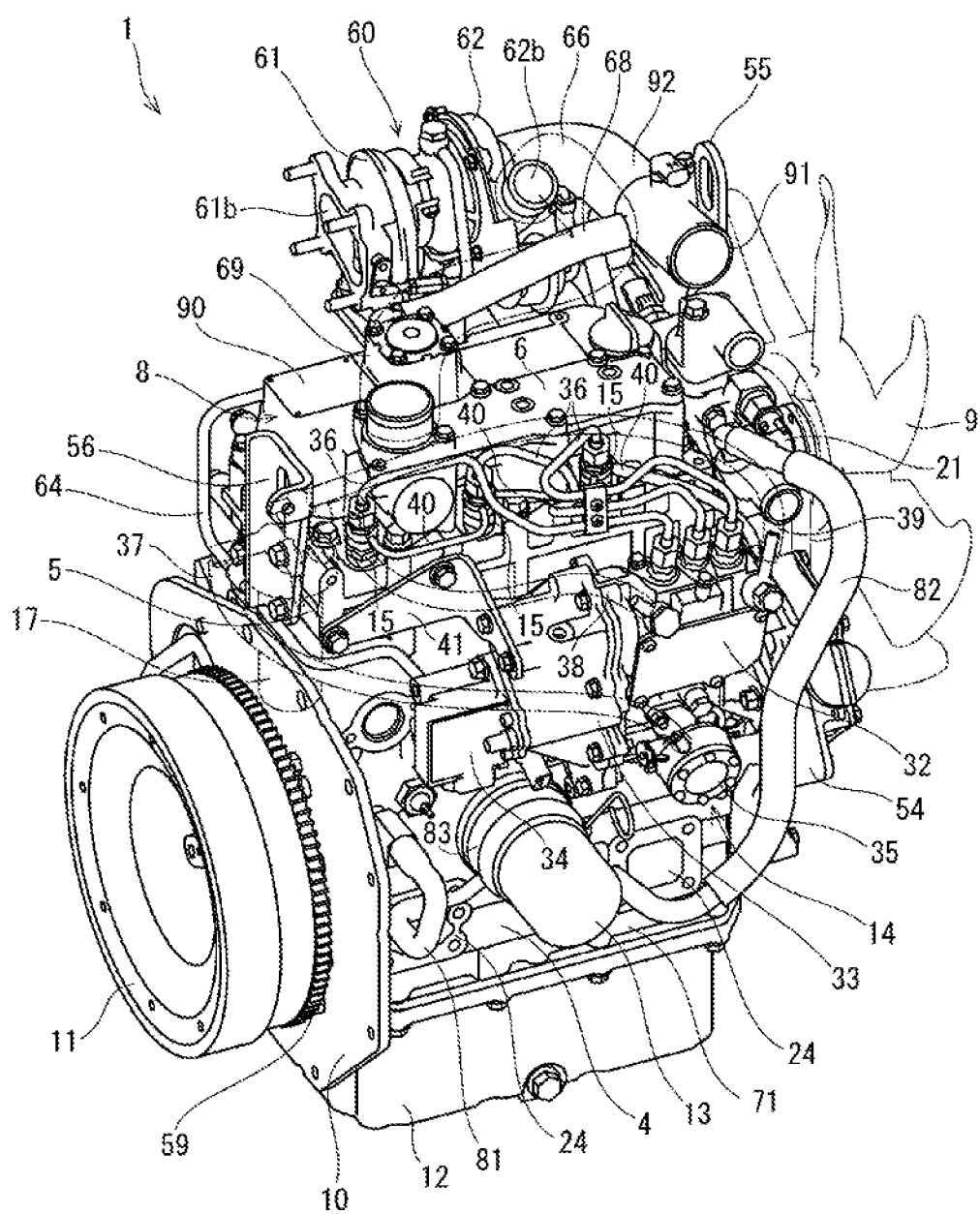
FIG. 7 A perspective view of the engine, seen diagonally from the rear.
Figure 8:
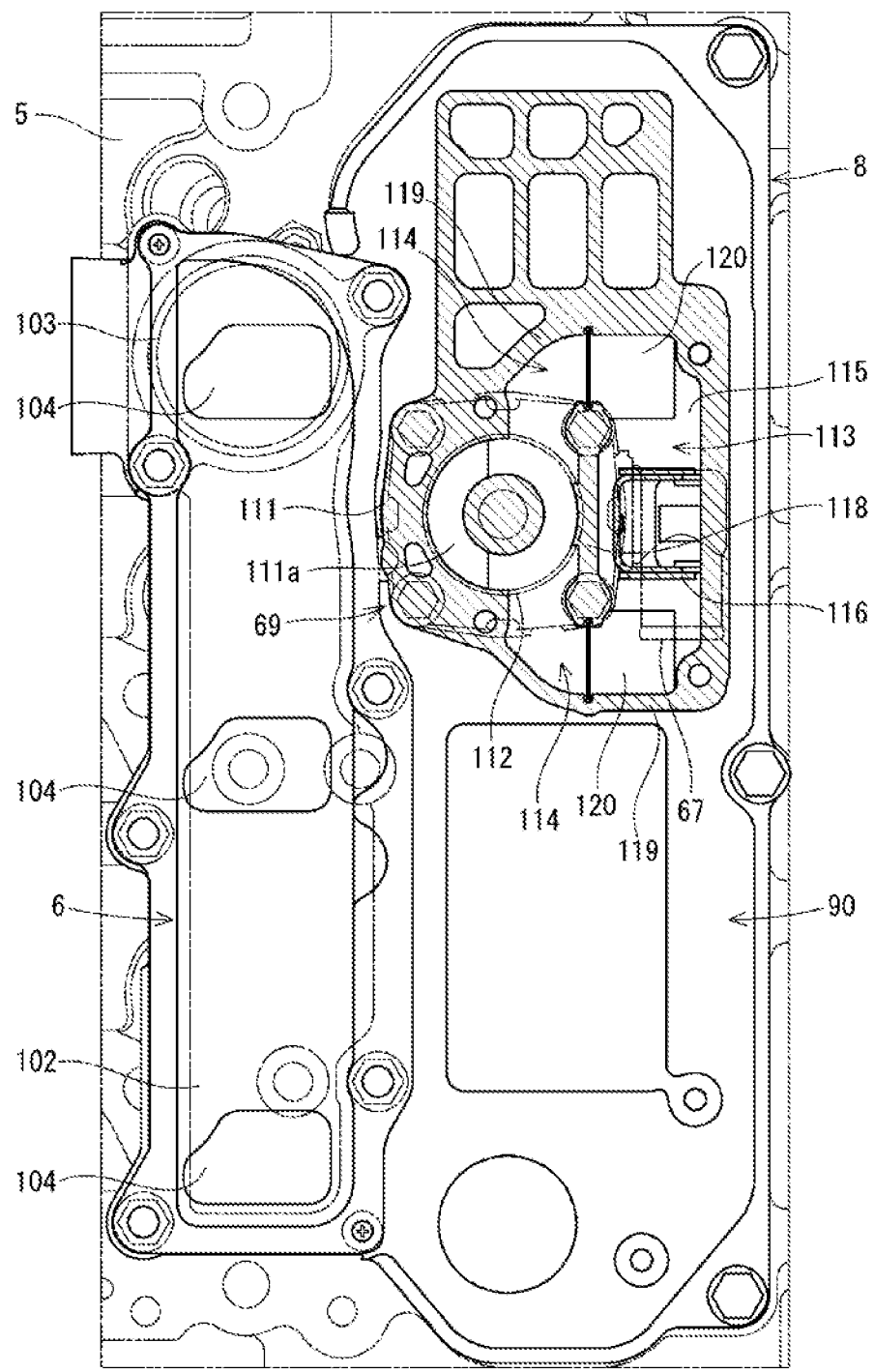
FIG. 8 A partial cross-section of a rocker-arm-chamber-integrated intake manifold, viewed in a plan view.

As illustrated in FIGS. 3 and 4, each of the left and right side surfaces of the cylinder block 4 has a lower portion provided with two engine mount attachment parts 24, which are aligned in a front-and-rear direction. To each of the engine mount attachment parts 24, an engine mount (not illustrated) including, e.g., an anti-vibration rubber part, can be fastened by a bolt. In the embodiment, the work machine includes a pair of left and right engine support chassis 25 by which the cylinder block 4 is sandwiched and supported. The engine mount attachment parts 24 are fastened by bolts to the engine support chassis 25 via the engine mounts (not illustrated). Consequently, the engine 1 is supported by both of the engine support chassis 25 of the work machine.

On the pair of left and right engine support chassis 25, the radiator 19 provided with a fan shroud 20 on its back surface is disposed in a standing manner such that the radiator 19 faces the front surface of the engine 1. The fan shroud 20 externally surrounds the cooling fan 9 (i.e., surrounds an outer periphery of the cooling fan 9), and allows the radiator 19 and the cooling fan 9 to communicate with each other. By rotation of the cooling fan 9, cooling air is blown to the radiator 19, and then the cooling air flows from the radiator 19 toward the engine 1 through the fan shroud 20.

The intake manifold part 6 has an inlet to which the air cleaner (not illustrated) is connected via an intake relay pipe 66, a compressor case 62 of a turbocharger 60, intake pipes 91 and 92, and the like. Fresh air (outside air) sucked into the air cleaner is subjected to dust removal and cleaning in the air cleaner. Thereafter, the fresh air thus cleaned is sent to the intake manifold part 6 through the intake pipes 91 and 92, the compressor case 62 (described in detail later), and the intake relay pipe 66, and is then supplied to the cylinders of the engine 1.

In the above-described configuration, fresh air is supplied from the air cleaner to the intake pipes 91 and 92. Meanwhile, blowby gas is supplied from a blowby-gas discharge port 67, which is provided to the rocker-arm-chamber-integrated intake manifold 8 (hereinafter, simply referred to as an "intake manifold"), to the first intake pipe 91 through a blowby-gas return pipe 68, so that the blowby gas is merged into the fresh air. As described above, the intake manifold 8 is made of the intake manifold part 6 disposed in the left-side portion of the intake manifold 8 and the rocker arm chamber part 90 disposed in the right-side portion of the intake manifold 8, the intake manifold part 6 and the rocker arm chamber part 90 being integrally formed. The rocker arm chamber part 90 has an upper surface provided with a positive crankcase ventilation device 69 protruding therefrom. The positive crankcase ventilation device 69 is configured to separate lubrication oil from blowby gas. The positive crankcase ventilation device 69 returns blowby gas having been leaked from the combustion chambers of the engine 1 to the first intake pipe 91 so that the blowby gas is sent to the combustion chambers again. This configuration avoids a phenomenon that the blowby gas, which contains exhaust gas and an unburned air-fuel mixture, is discharged to the atmospheric air.

Figure 23:
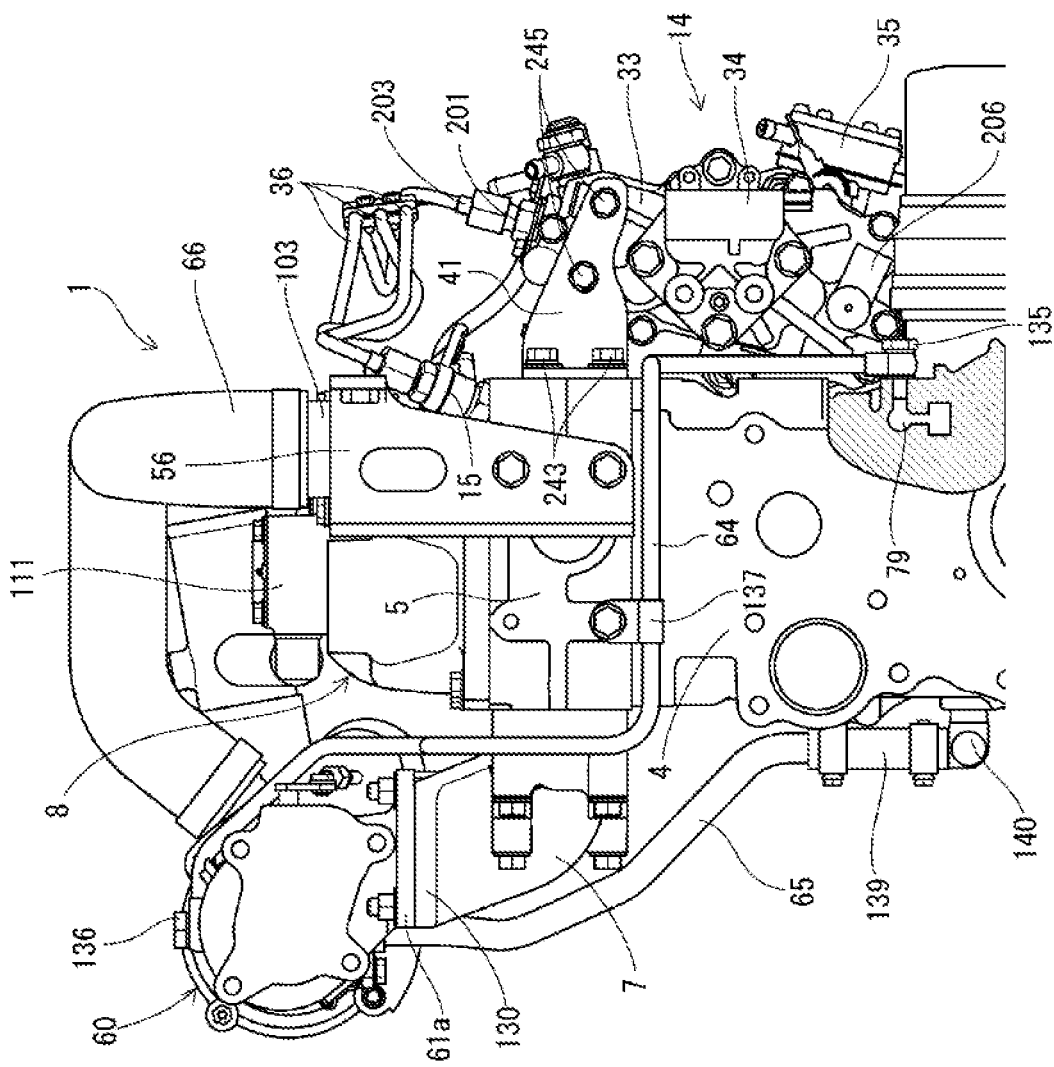
FIG. 23 A back view of the components of the exhaust system and a partial cross-section of a cylinder block.
Figure 24:
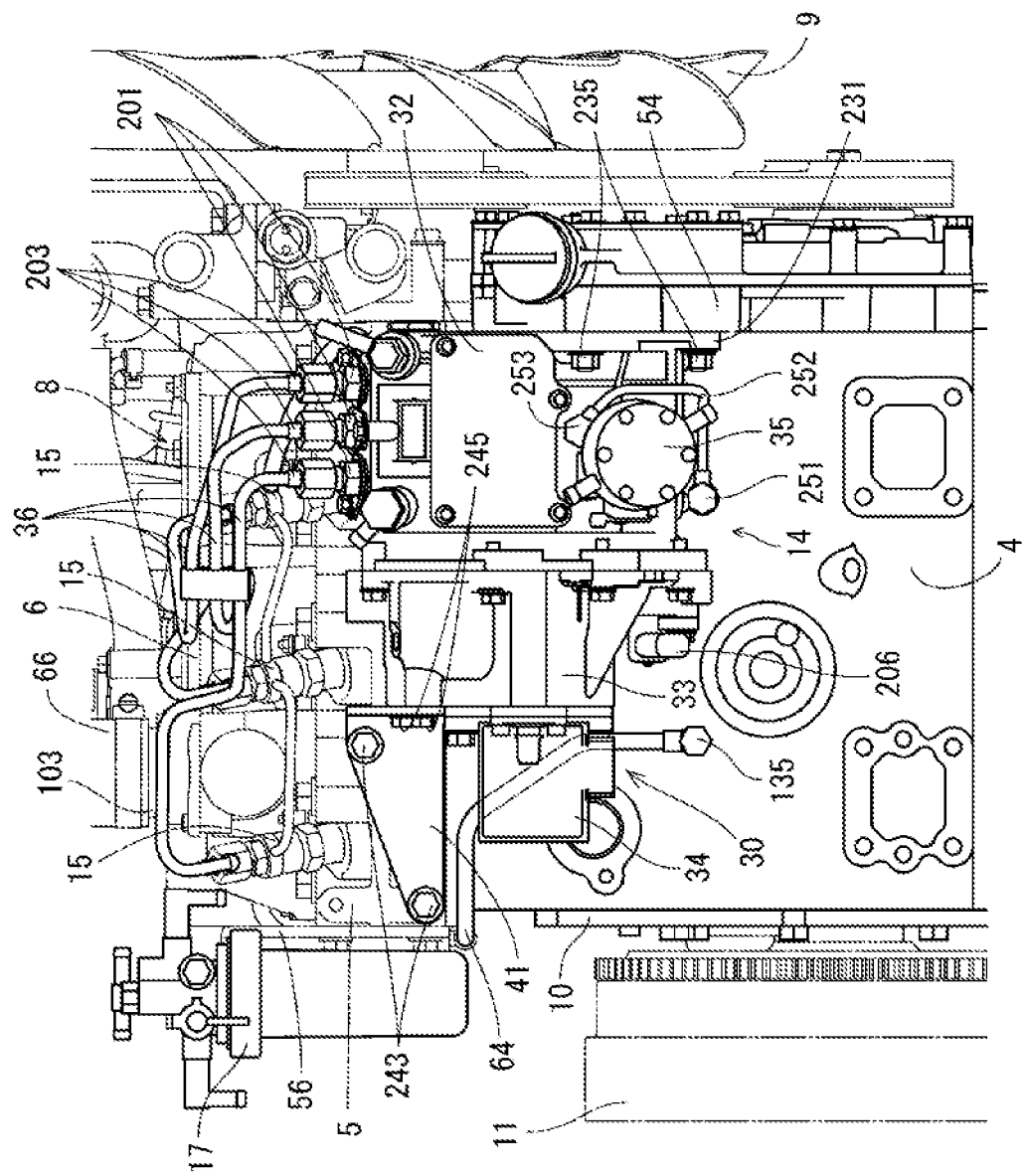
FIG. 24 A right side view illustrating a configuration of a fuel injection pump device.
Figure 25:
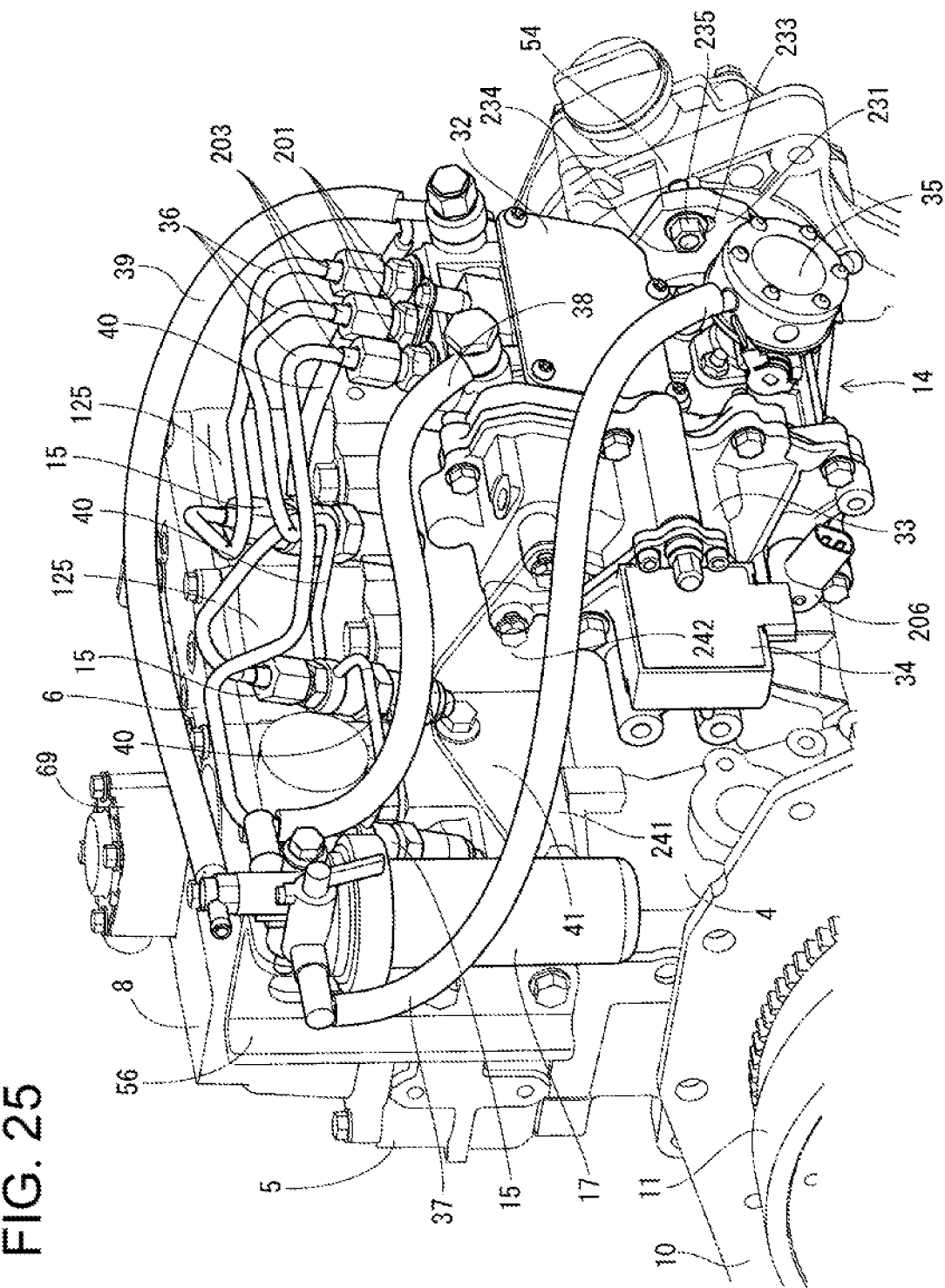
FIG. 25 A perspective view illustrating a configuration of the fuel injection pump device and its peripheral components.
Figure 26:
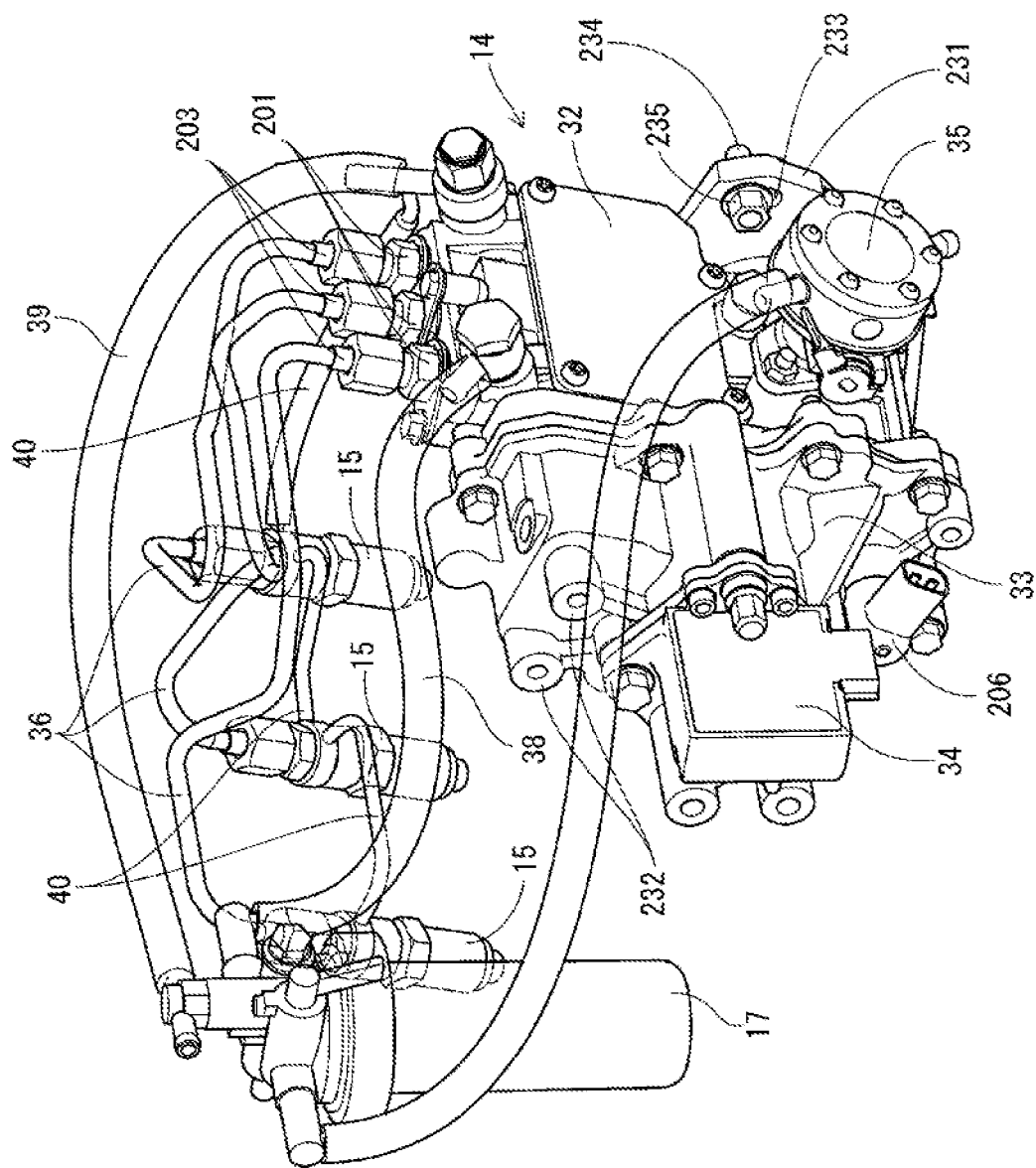
FIG. 26 A perspective view illustrating a configuration of a fuel system including the fuel injection pump device.

The turbocharger 60 is positioned, on the left side of the cylinder head 5, above the exhaust manifold 7. The turbocharger 60 includes a turbine case 61 in which a turbine wheel is accommodated, a compressor case 62 in which a blower wheel is accommodated, and a center housing 63 (see FIG. 15) in which the turbine case 61 and the compressor case 62 are coupled to each other. The center housing 63 has an upper portion connected to a lubrication-oil feeding pipe 64 (oil feeding pipe) which is branched off from a lubrication-oil feeding passage 79 (see FIG. 23) inside the cylinder block 4 and through which lubrication oil is fed to rotating parts in the center housing 63. The center housing 63 has a lower portion connected to a lubrication-oil return pipe 65 through which lubrication oil having been fed into the center housing 63 is returned to a lubrication-oil return path (not illustrated) inside the cylinder block 4.

The exhaust manifold 7 has an exhaust gas outlet connected to an exhaust inlet (an exhaust-side inlet of the turbocharger 60) 61a of the turbine case 61. Specifically, exhaust gas having been discharged to the exhaust manifold 7 from the cylinders of the engine 1 passes through the turbine case 61 of the turbocharger 60, and is then emitted to the outside. The turbine case 61 has an exhaust outlet (an exhaust-side outlet of the turbocharger 60) 61b connected to, e.g., a silencer and a tail pipe via an exhaust pipe. Exhaust gas is emitted to the outside from the exhaust outlet 61b of the turbocharger 60 through, e.g., the silencer and the tail pipe.

The compressor case 62 has an intake inlet (an intake-side inlet of the turbocharger 60) 62a connected to a fresh-air outflow side of the air cleaner (not illustrated) via the second intake pipe 92, the first intake pipe 91, and the like. The compressor case 62 has an intake outlet (an intake-side outlet of the turbocharger 60) 62b connected to the intake manifold part 6 of the intake manifold 8 via the intake relay pipe 66. Specifically, fresh air having been subjected to dust removal in the air cleaner is sent from the compressor case 62 to the intake manifold part 6 through the intake relay pipe 66, and is then supplied to the cylinders in the engine 1.

Next, with reference to FIGS. 8 to 14, a configuration of the intake manifold 8 will be described. As described above, the intake manifold 8 includes the intake manifold part 6 (intake manifold) that is in the left-side portion and extends in the front-and-rear direction and the rocker arm chamber part 90 (rocker arm chamber) that is in the right-side portion and extends in the front-and-rear direction. The intake manifold 8 includes a partitioning wall 101 by which the intake manifold part 6 and the rocker arm chamber part 90 are divided from each other to isolate the intake manifold part 6 and the rocker arm chamber part 90 from each other.

The intake manifold part 6 has an upper plane covered with an intake lid 102. The intake lid 102 is fixed by two screws to upper portions of side walls of the intake manifold part 6, and is fastened by six bolts to the cylinder head 5 via the intake manifold part 6. The intake manifold 8 is also fastened by three bolts to the cylinder head 5 via a portion of a rim of the intake manifold 8, the portion being close to the rocker arm chamber part 90.

The intake lid 102 has, on its upper surface, an intake inlet 103 protruding upward therefrom. The intake manifold part 6 has, on its bottom surface, three intake outlets 104 which are aligned in the front-and-rear direction of the engine 1 and which are connected to intake introduction ports of the three cylinders disposed in the upper surface of the cylinder head 5. On the right side surface of the intake manifold part 6, two recesses 125 for mounting injectors (injector mounting recesses 125) are disposed. Each of the injector mounting recesses 125 is interposed between adjacent ones of the intake outlets 104. Namely, in the example of the present embodiment, the two injector mounting recesses 125 and the three intake outlets 104 are alternately arranged one by one in a direction along the output shaft 3 of the engine 1, in the intake manifold part 6 of the intake manifold 8.

Each of the injector mounting recesses 125 is a cutout formed in the bottom surface of the intake manifold part 6 such that the cutout extends from the right side surface of the intake manifold part 6 to the partitioning wall 101. Thus, spaces for mounting the injectors 15, which are opened rightward, are defined by the cylinder head 5 and the injector mounting recesses 125. The injectors 15 are inserted into the cylinder head 5 under the injector mounting recesses 125. Thanks to the configuration in which the injector mounting recesses 125 are opened rightward, the fuel injection pipes 36 and the fuel return pipes 39 and 40, which are to be connected to the fuel injection pump device 14 and the injectors 15 disposed on the right side of the cylinder head 5, can be installed through a short path with a simplified installation work.

The rocker arm chamber part 90 has an upper portion provided with the positive crankcase ventilation device 69 protruding therefrom and being configured to return blowby gas to the intake system. The positive crankcase ventilation device 69 has a gas discharge part 111 that is a portion of the upper surface of the intake manifold 8, the portion expanding upward. The gas discharge part 111 has, on its upper surface, a gas pressure adjustment valve 112. The gas discharge part 111 has, on its left side surface, the blowby-gas discharge port 67.

The gas discharge part 111 includes, in its inside, a gas discharge passage 111a and a gas discharge passage 111b. The gas discharge passage 111a partially serves also as a pressure control chamber. The gas discharge passage 111b leads to the blowby-gas discharge port 67. In the gas discharge part 111, the gas discharge passage 111a extends from a lower portion of the gas discharge part 111 to an upper portion of the gas discharge part 111. The gas discharge passage 111a includes a portion being located close to an upper surface of the gas discharge part 111 and having an annular shape surrounding the periphery of the opening of the gas discharge passage 111b. This portion of the gas discharge passage 111a also serves as the pressure control chamber. The gas discharge passage 111b extends downward from the upper surface of the gas discharge part 111 and is bent toward a left side surface of the gas discharge part 111, so as to be connected to the blowby-gas discharge port 67.

The gas pressure adjustment valve 112 includes a valve case 122 and a diaphragm 123 for pressure control. The valve case 122 is disposed in the upper surface of the gas discharge part 111. The diaphragm 123 includes a valve body 124, which is disposed between the gas discharge passage 111a serving also as the pressure control chamber and the gas discharge passage 111b leading to the blowby-gas discharge port 67. Fluid communication between the gas discharge passages 111a and 111b is normally shut off by the valve body 124. If a pressure in the gas discharge passage 111a becomes a certain pressure or more, the diaphragm 123 is pressed upward, so that the valve body 124 moves upward and is opened. Consequently, the gas discharge passages 111a and 111b communicate with each other.

In the rocker arm chamber part 90, a gas introduction chamber 113 and inner passages 114 are formed in a bottom portion of the gas discharge part 111. Into the gas introduction chamber 113, blowby gas having leaked from, e.g., the combustion chambers in the engine 1 toward the upper surface of the cylinder head 5 is introduced. Via the inner passages 114, the gas discharge passage 111a and the gas introduction chamber 113 are connected to each other. To the bottom portion of the gas discharge part 111, a shielding plate 115 is fixed by a screw 117. The bottom-surface sides of the gas introduction chamber 113 and the inner passages 114 are shielded, by the shielding plate 115, from the upper-surface side of the rocker arm chamber part 90.

The gas introduction chamber 113 has a bottom-side opening formed in the shielding plate 115. To the bottom-side opening, a gas introduction part 116 that is tubular is bonded. In the rocker arm chamber part 90, the gas introduction part 116 is disposed close to an inner wall of a left side surface of the rocker arm chamber part 90. The gas introduction part 116 has a gas outlet positioned inside the gas introduction chamber 113. Meanwhile, the gas introduction part 116 has a gas inlet at a position that is inside the rocker arm chamber part 90 and is close to the cylinder head 5. The gas introduction part 116 has, in its upper end, a lid member to prevent occurrence of a phenomenon that lubrication oil in the form of liquid coming from the cylinder head 5 directly enters the gas introduction chamber 113. Meanwhile, the gas introduction part 116 guides blowby gas in the rocker arm chamber part 90 upward from the position being inside the rocker arm chamber part 90 and being close to the cylinder head 5 into the gas introduction chamber 113 in the positive crankcase ventilation device 69.

The gas discharge part 111 has, in its bottom portion, a dividing wall 118 by which the gas introduction chamber 113 and the inner passages 114 are divided from each other. The dividing wall 118 is disposed away from a peripheral wall 119 of the positive crankcase ventilation device 69. Between the dividing wall 118 and the peripheral wall 119, the gas introduction chamber 113 and the plurality of inner passages 114 are formed. The plurality of inner passages 114 is arranged in a maze-like pattern to achieve a labyrinth structure.

At two positions between the dividing wall 118 and the peripheral wall 119, oil trap materials (filtration nets) 120 are respectively provided. Each of the oil trap materials 120 is made of, e.g., steel wool, and catches lubrication oil in the form of mist contained in blowby gas. In the present embodiment, the oil trap materials 120 are arranged in the front-and-rear direction of the engine 1 across the dividing wall 118. Each of the oil trap materials 120 is provided between the gas introduction chamber 113 and the inner passages 114.

Figure 9:
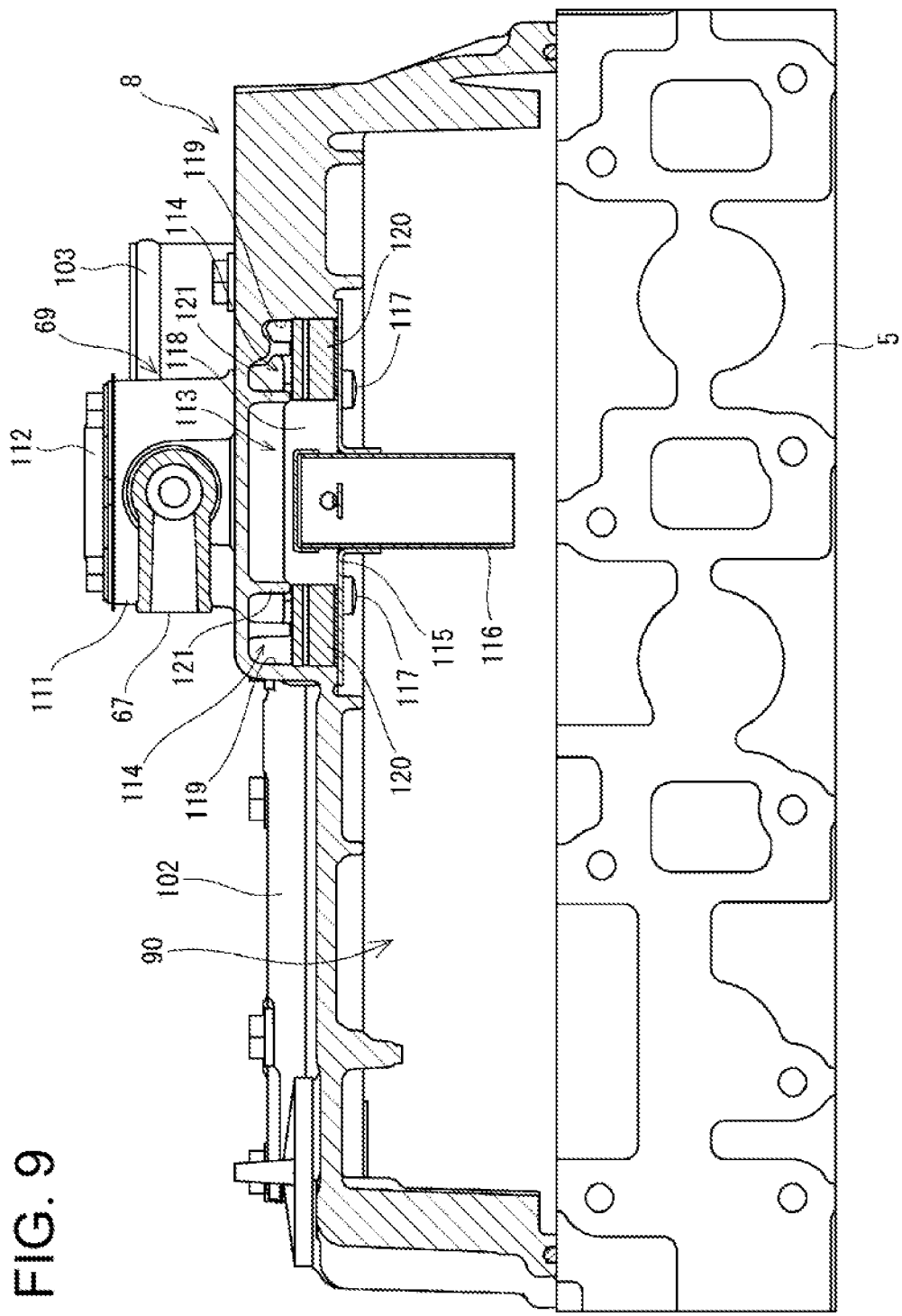
FIG. 9 A cross-sectional view of a left side of the rocker-arm-chamber-integrated intake manifold.
Figure 10:
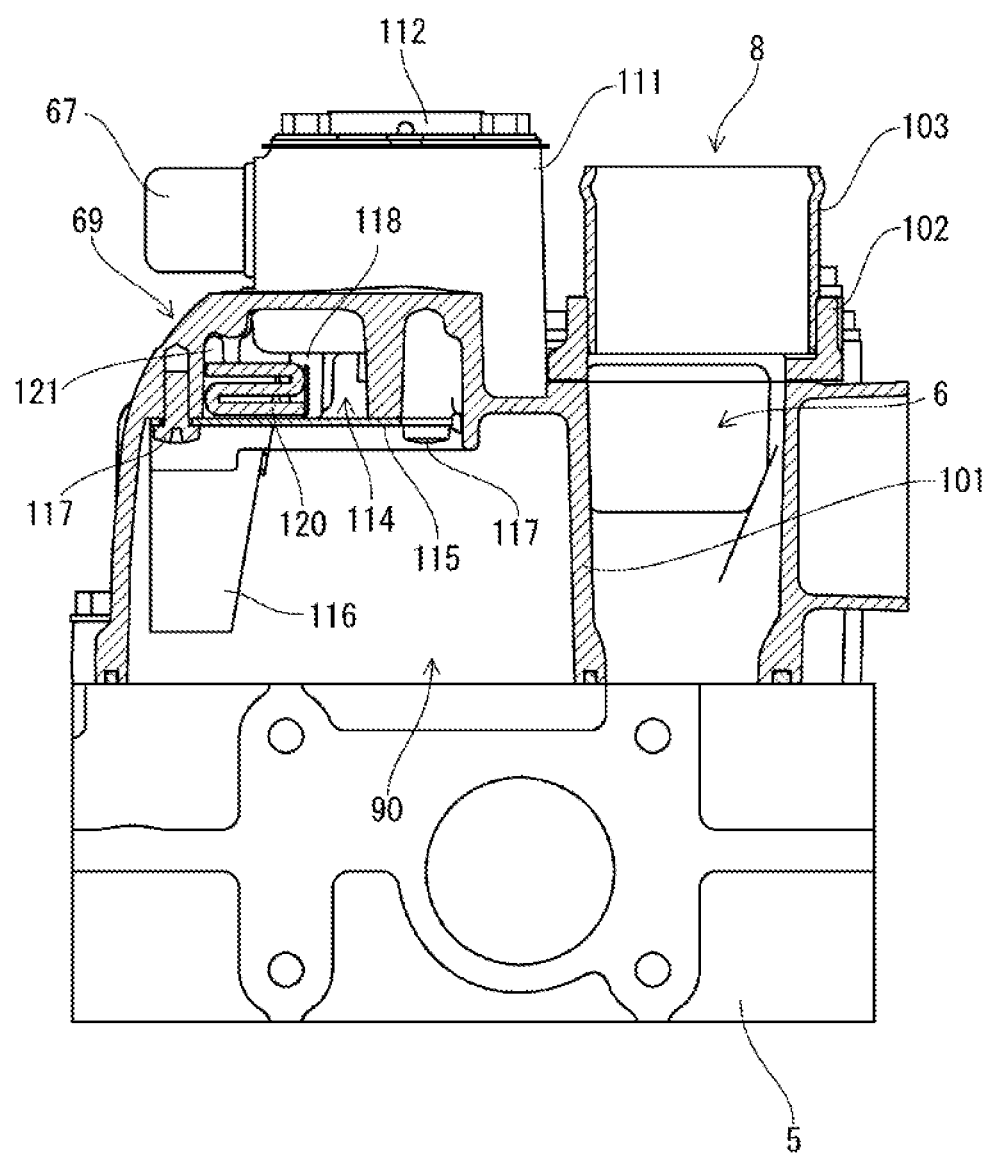
FIG. 10 A cross-sectional view of a back side of the rocker-arm-chamber-integrated intake manifold.
Figure 11:
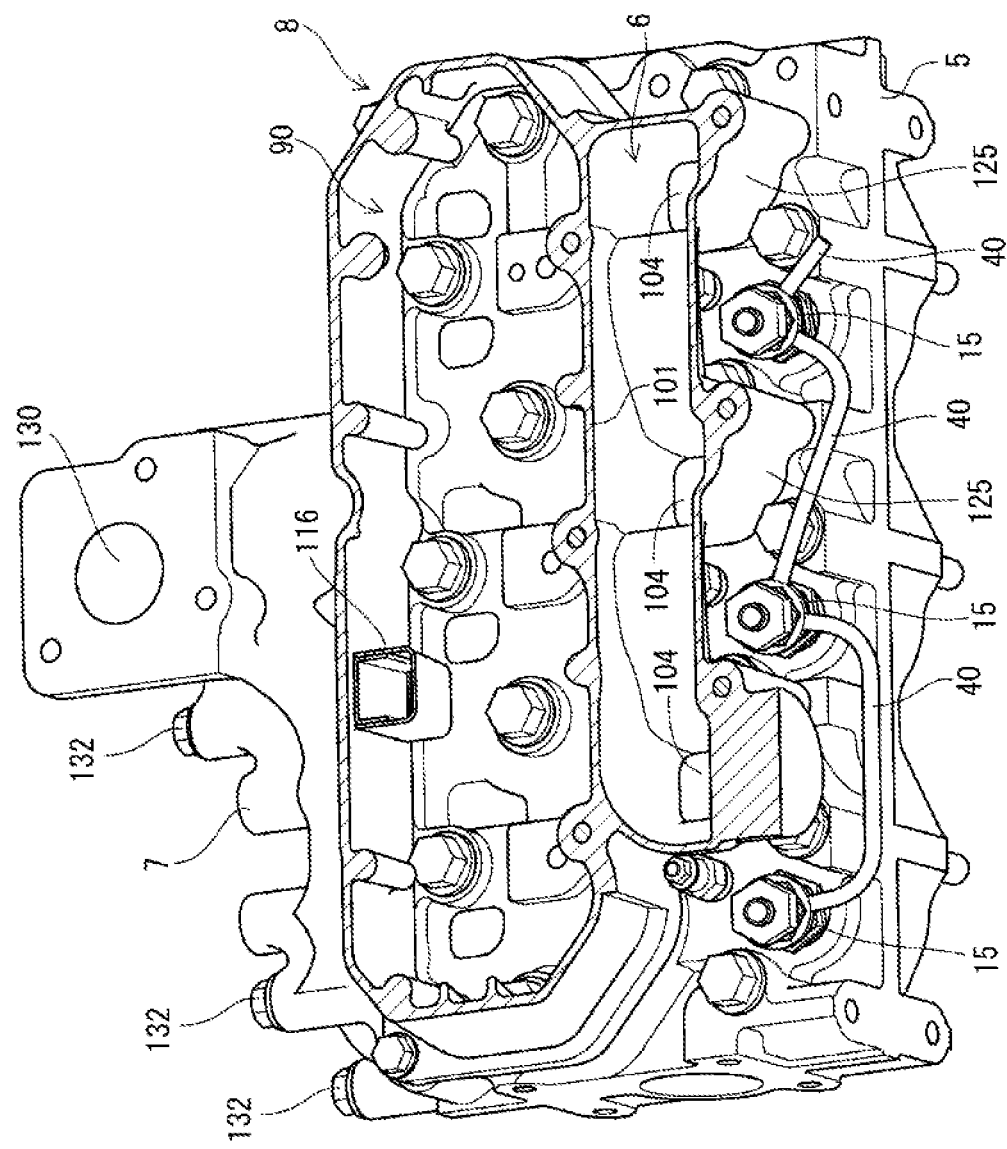
FIG. 11 A perspective cross-sectional view of the rocker-arm-chamber-integrated intake manifold.
Figure 12:
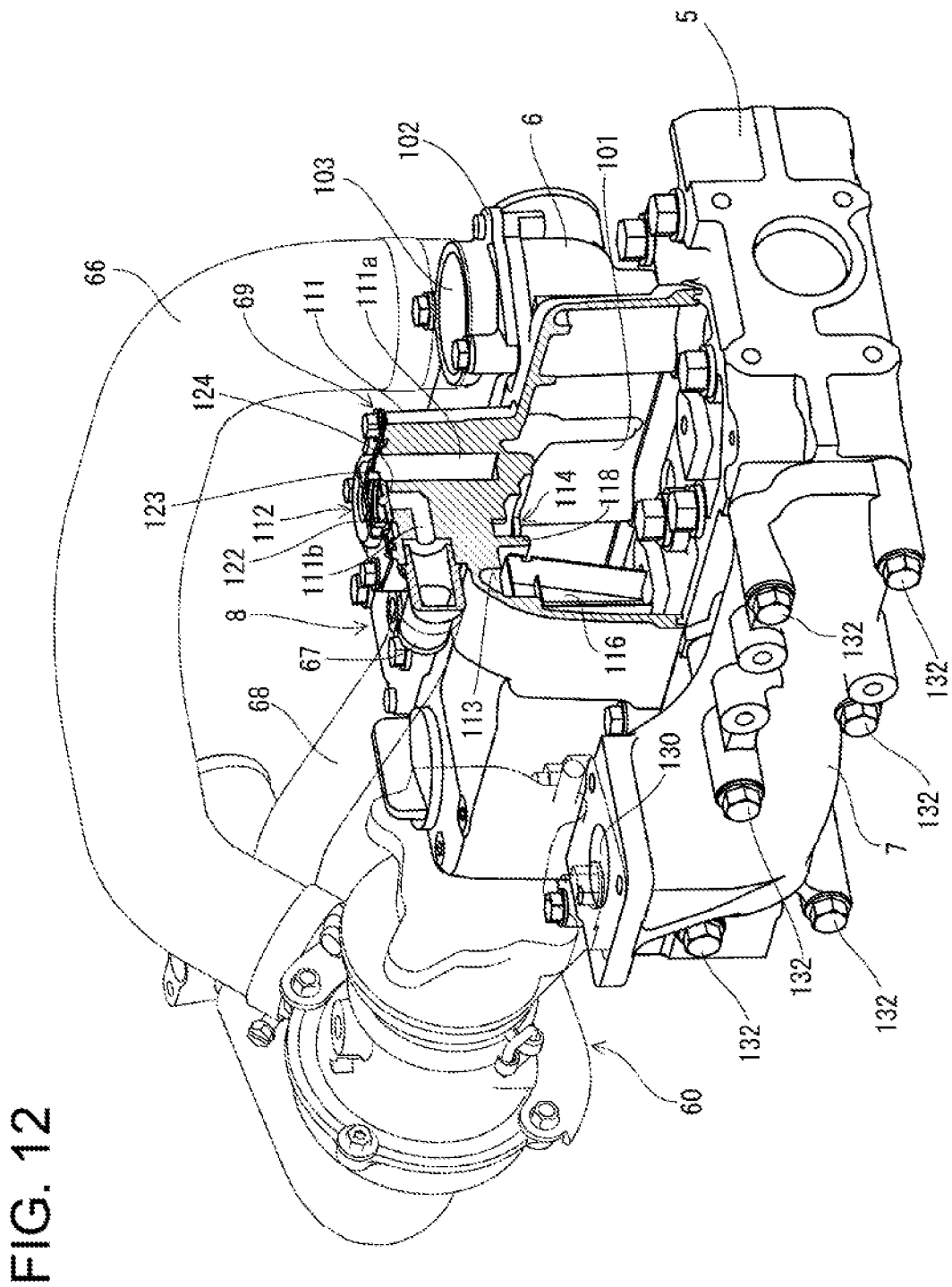
FIG. 12 A perspective cross-sectional view of a rocker arm chamber and a positive crankcase ventilation device included in the rocker-arm-chamber-integrated intake manifold.
Figure 13:
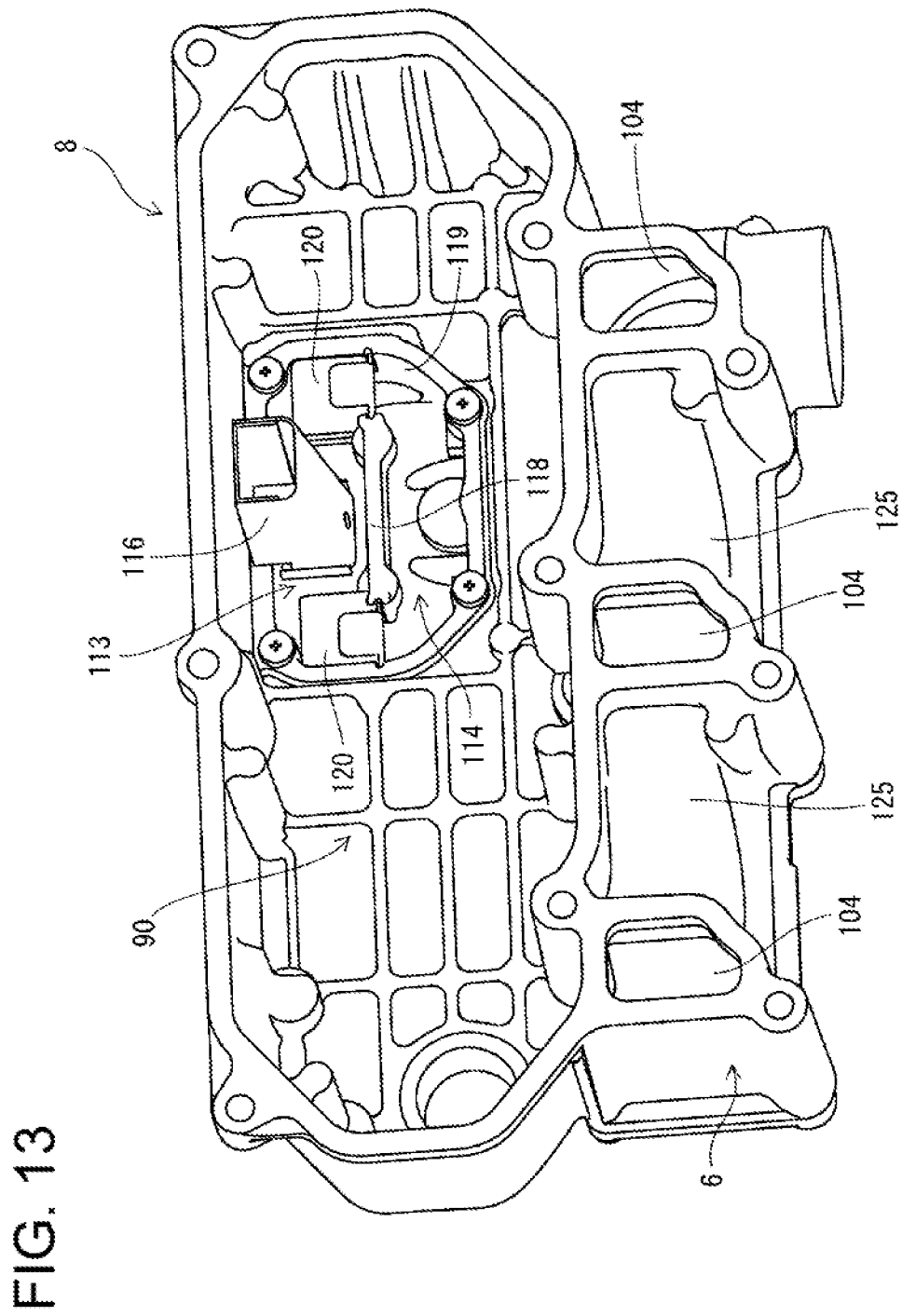
FIG. 13 A perspective view of the rocker-arm-chamber-integrated intake manifold, seen from the bottom side.
Figure 14:
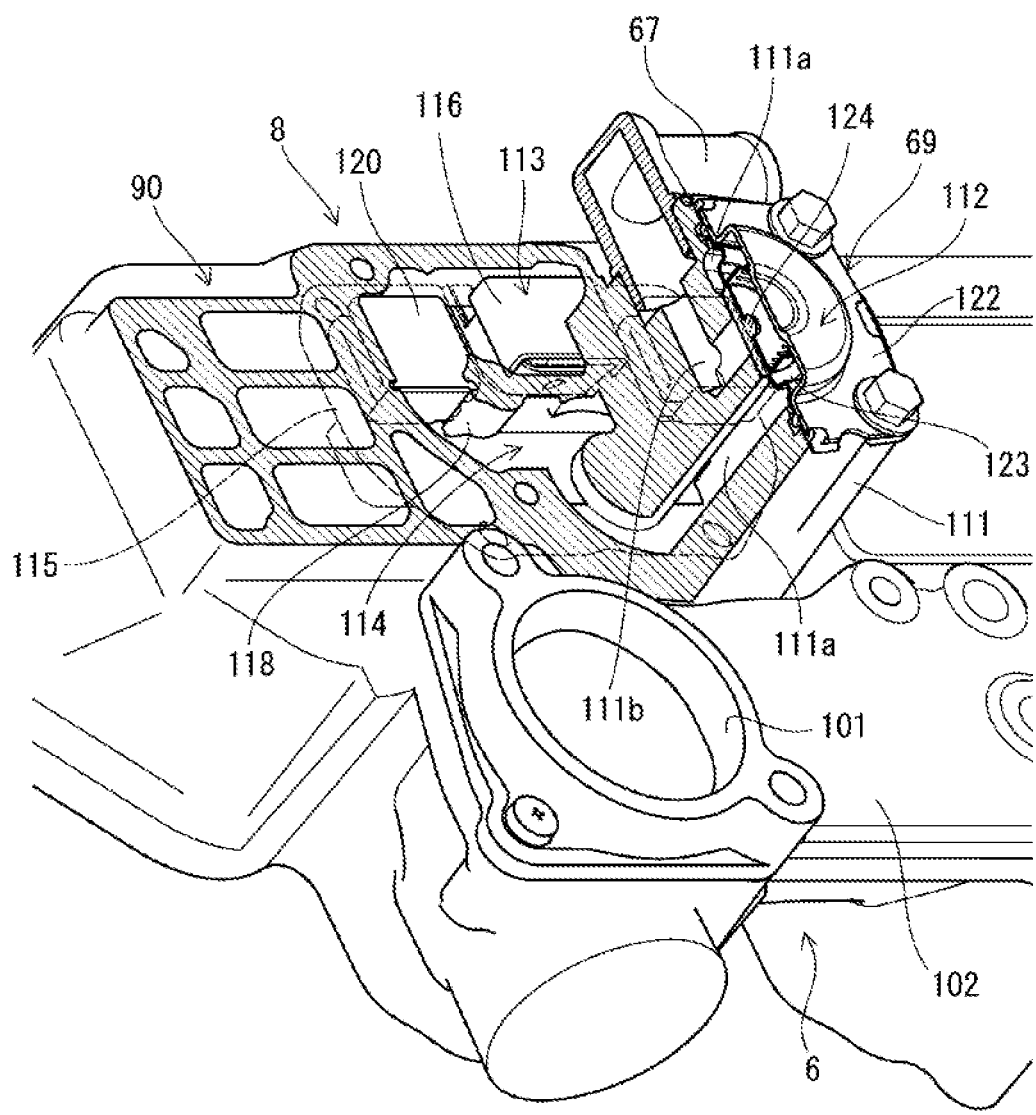
FIG. 14 A perspective cross-sectional view of the positive crankcase ventilation device.

As illustrated in the FIG. 9, the gas introduction chamber 113 has an upper inner surface provided with beam-shaped dividing walls 121 protruding downward in a suspended manner. The beam-shaped dividing walls 121 are disposed at two locations between which the gas introduction part 116 is interposed. Each of the beam-shaped dividing walls 121 is provided in a suspended manner at a position between a corresponding one of the oil trap materials 120 and the gas introduction chamber 113 and above the corresponding one of the oil trap materials 120. A space surrounded by the peripheral wall 119, an upper surface of a corresponding one of the oil trap materials 120, and a corresponding one of the beam-shaped dividing walls 121 is a part of the inner passages 114, through which blowby gas flows.

Blowby gas in the rocker arm chamber part 90 is introduced into the positive crankcase ventilation device 69 through the gas discharge part 111. Then, the blowby gas passes through the gas introduction chamber 113, the inner passages 114 having a maze-like pattern, the gas discharge passage 111a, the valve body 124 of the diaphragm 123, and the gas discharge passage 111b. During this, the blowby gas is subjected to removal of a lubrication oil component and/or the like by these passages and the oil trap materials 120. Then, the blowby gas is sent to the blowby-gas discharge port 67. The blowby gas from which the lubrication oil component and/or the like has been removed is returned to the intake system from the blowby-gas discharge port 67 through the blowby-gas return pipe 68 (see FIG. 6).

In the engine 1 of the present embodiment, the intake manifold 8 made of the intake manifold part 6 and the rocker arm chamber part 90 that are integrally formed is disposed on the upper surface of the cylinder head 5. Thus, the intake manifold part 6 and the rocker arm chamber part 90 can be arranged compactly. Furthermore, in the engine 1 of the present embodiment, the positive crankcase ventilation device 69 is provided on the upper portion of the rocker arm chamber part 90 such that the positive crankcase ventilation device 69 protrudes therefrom, and blowby gas is caused to pass through the blowby-gas return pipe 68 (gas conduit) connected to the blowby-gas discharge port 67 on the side surface of the positive crankcase ventilation device 69 and to be discharged to the intake-side inlet 62a of the turbocharger 60. Thus, the turbocharger 60 and the positive crankcase ventilation device 69 can be arranged close to each other, and thus can be arranged compactly.

In addition, with the configuration in which the blowby-gas discharge port 67 is disposed on the side surface of the positive crankcase ventilation device 69, the blowby-gas return pipe 68, which is be connected to the blowby-gas discharge port 67, can be placed flexibly. Furthermore, with the configuration in which the positive crankcase ventilation device 69 is disposed above the rocker arm chamber part 90 such that the positive crankcase ventilation device 69 protrudes therefrom, it is possible to prevent a decrease in inner volume of the rocker arm chamber part 90 that might be caused by installation of the positive crankcase ventilation device 69. Consequently, the rocker arm chamber 90 can achieve a volume sufficient to deal with blowby gas increased by installation of the turbocharger 60, without a significant increase in volume of the rocker arm chamber part 90, hence, without a significant increase in external dimensions of the intake manifold 8.

Moreover, with the above-described configuration, the blowby-gas discharge port 67 disposed on the side surface of the positive crankcase ventilation device 69 and the turbocharger 60 can be arranged close to each other. Thus, it is possible to easily position the blowby-gas return pipe 68 and to shorten the length of the blowby-gas return pipe 68 to be installed. With the blowby-gas return pipe 68 having a shorter length, it is possible to avoid a situation in which the blowby-gas return pipe 68 is blocked due to freezing, bending, and/or the like that might otherwise occur in the blowby-gas return pipe 68.

In addition, in the engine 1 of the present embodiment, the plurality of inner passages 114 in the positive crankcase ventilation device 69 has a labyrinth structure with a maze-like pattern. Thus, the labyrinth structure formed in the positive crankcase ventilation device 69 can be made compact without a significant increase in volume of the rocker arm chamber part 90, hence, without a significant increase in external dimensions of the intake manifold 8. With such a labyrinth structure, it is also possible to remove lubrication oil, unburned fuel, and/or the like contained in blowby gas.

Furthermore, in the engine 1 of the present embodiment, the oil trap materials 120 are disposed between the dividing wall 118, by which the gas introduction chamber 113 and the inner passages 114 are divided from each other, and the peripheral wall 119 of the positive crankcase ventilation device 69. This configuration allows blowby gas flowing from the gas outlet of the gas introduction part 116 to the inner passages 114 while going around the dividing wall 118 to pass through the oil trap materials 120. Consequently, it is possible to remove, with the oil trap materials 120, lubrication oil and/or the like contained in the blowby gas.

Moreover, in the engine 1 of the present embodiment, the inner passages 114 includes, as a part thereof, spaces each surrounded by a corresponding one of the beam-shaped dividing walls 121 disposed in a suspended manner at a position between a corresponding one of the oil trap materials 120 and the gas introduction chamber 113 and above the corresponding one of the oil trap materials 120, the upper surface of the corresponding one of the oil trap materials 120, and the peripheral wall 119. With this configuration, it is possible to cause blowby gas to pass through the gas introduction chamber 113 and the insides of the oil trap materials 120 when the blowby gas flows from the gas outlet of the gas introduction part 116 toward the upper surfaces of the oil trap materials 120. Consequently, it is possible to remove, with the oil trap materials 120, lubrication oil and/or the like contained in the blowby gas.

Next, with reference to FIGS. 15 to 19, a configuration of the intake pipe and its peripheral components will be described. In the engine 1 of the present embodiment, the first intake pipe 91 whose first end (upstream side) is connected to the air cleaner (not illustrated) is disposed at a location between the cooling fan 9 and the blowby-gas discharge port 67. Specifically, the first intake pipe 91 is disposed at a location which is close to the front side (a first one of the front and rear side surfaces) of the engine 1 and which is higher than the coolant pump 21. The first end of the first intake pipe 91 is a fresh-air inflow port 91a.

The first intake pipe 91 is made of, e.g., a metal, and has a substantially T-shaped appearance. The fresh-air inflow port 91a of the first intake pipe 91 is opened toward the right side (a second one of the left and right side surfaces) of the engine 1. The first intake pipe 91 has, in its second end (downstream side), a fresh-air outflow port 91b that is opposed to the fresh-air inflow port 91a and is opened toward the left side (a first one of the left and right side surfaces) of the engine 1. A portion of the first intake pipe 91 which is between the fresh-air inflow port 91a and the fresh-air outflow port 92b has a substantially straight-cylindrical shape.

On the outer peripheral surface of the first intake pipe 91, a connecting part 91c having a substantially cylindrical shape is integrally formed such that the connecting part 91c protrudes outward therefrom. The connecting part 91c is positioned at a location between the center of the first intake pipe 91 and the fresh-air outflow port 91b. The connecting part 91a has a distal end that is a blowby-gas inflow port 91d opened toward the blowby-gas discharge port 67 (toward the rear side of the engine 1). The blowby-gas inflow port 91d is connected with a second end of the blowby-gas return pipe 68, which has a first end connected to the blowby-gas discharge port 67.

The fresh-air outflow port 91b of the first intake pipe 91 is connected to a fresh-air inflow port 92a that is a first end of the second intake pipe 92. The second intake pipe 92 is made of, e.g., a resin, and is substantially L-shaped. The second intake pipe 92 has a second end that is a fresh-air outflow port 92b connected to an intake inlet 62a of the compressor case 62 of the turbocharger 60. The intake inlet 62a of the compressor case 62 is opened toward the cooling fan 9. The second intake pipe 92, which has a curved part, is formed such that a length from the first end 92a to the curved part is longer than a length from the second end 92b to the curved part.

Thus, in the engine 1 of the present embodiment, the first intake pipe 91 and the upstream portion of the second intake pipe 92 connected to the intake inlet 62a of the turbocharger 60 are positioned along the left-and-right direction, and extend toward the right side surface of the engine 1. Thus, it is possible to compactly arrange the intake pipes 91 and 92 connected to the turbocharger 60, without causing the intake pipes 91 and 92 to protrude from the front side surface of the engine 1.

Incidentally, consider a case where a turbocharger is mounted in a traditional small-displacement engine with, e.g., three or less cylinders. If an intake pipe having a straight-line shape is attached to an intake-side inlet of the turbocharger in such an engine, a space between the intake-side inlet of the turbocharger and engine components (e.g., a cooling fan, a fan shroud, and a radiator) positioned close to a first side surface in a front-and-rear direction of the engine becomes small. Thus, the attachment of the intake pipe may sometimes be difficult. In the engine 1 of the present embodiment, even in a case where a space between the intake inlet 62a of the turbocharger 60 and engine components (e.g., the cooling fan 9, the fan shroud 20, and the radiator 19 (see FIGS. 3 and 4)) positioned close to the front side of the engine 1 is small, it is possible to achieve a space in which a fresh-air pipe 99 (see FIG. 17) communicating with the air cleaner (not illustrated) is connected to the first intake pipe 91, and it is also possible to improve workability in attachment/detachment of the fresh-air pipe 99 to/from the first intake pipe 91.

As illustrated in FIGS. 15 to 18, the blowby-gas return pipe 68, which extends from the blowby-gas discharge port 67 toward the front side of the engine 1 and is connected to the connecting part 91c of the first intake pipe 91, is inclined upward toward the connecting part 91c of the first intake pipe 91. This configuration can prevent a phenomenon that lubrication oil and/or unburned fuel adhered on the inner wall of the blowby-gas return pipe 68 enters the first intake pipe 91. This can reduce the possibility that lubrication oil and/or the like may be mixed in combustion air (fresh air) supplied to the engine 1, and also can reduce the possibility that the passage of the intake system, examples of which include the compressor case 62 of the turbocharger 60, may be stained by lubrication oil and/or the like.

In addition, since the upstream-side portion of the series of intake pipes 91 and 92 is disposed to extend toward the right side surface of the engine 1 in the left-and-right direction, the blowby-gas return pipe 68, which is connected to the connecting part 91c of the first intake pipe 91, can be disposed to extend from the blowby-gas discharge port 67 in a straight line, viewed in a plan view. With this configuration, positioning of the blowby-gas return pipe 68 is easy, and the length of the blowby-gas return pipe 68 to be installed can be made shorter. With the blowby-gas return pipe 68 having a shorter length, it is possible to avoid a situation in which the blowby-gas return pipe 68 is blocked due to freezing, bending, and/or the like that might otherwise occur in the blowby-gas return pipe 68. Furthermore, with the configuration in which the blowby-gas return pipe 68 is disposed just above the intake manifold 8, it is possible to avoid a situation in which the blowby-gas return pipe 68 is blocked due to freezing and/or the like that might otherwise occur in the blowby-gas return pipe 68, thanks to heat from the engine 1. Moreover, most part of the blowby-gas return pipe 68 overlaps the first intake pipe 91 in a front view. Thus, the blowby-gas return pipe 68 has a small area exposed to the cooling fan 9. This configuration contributes to prevention of freezing in the blowby-gas return pipe 68 that might otherwise occur due to cooling air.

Figure 15:
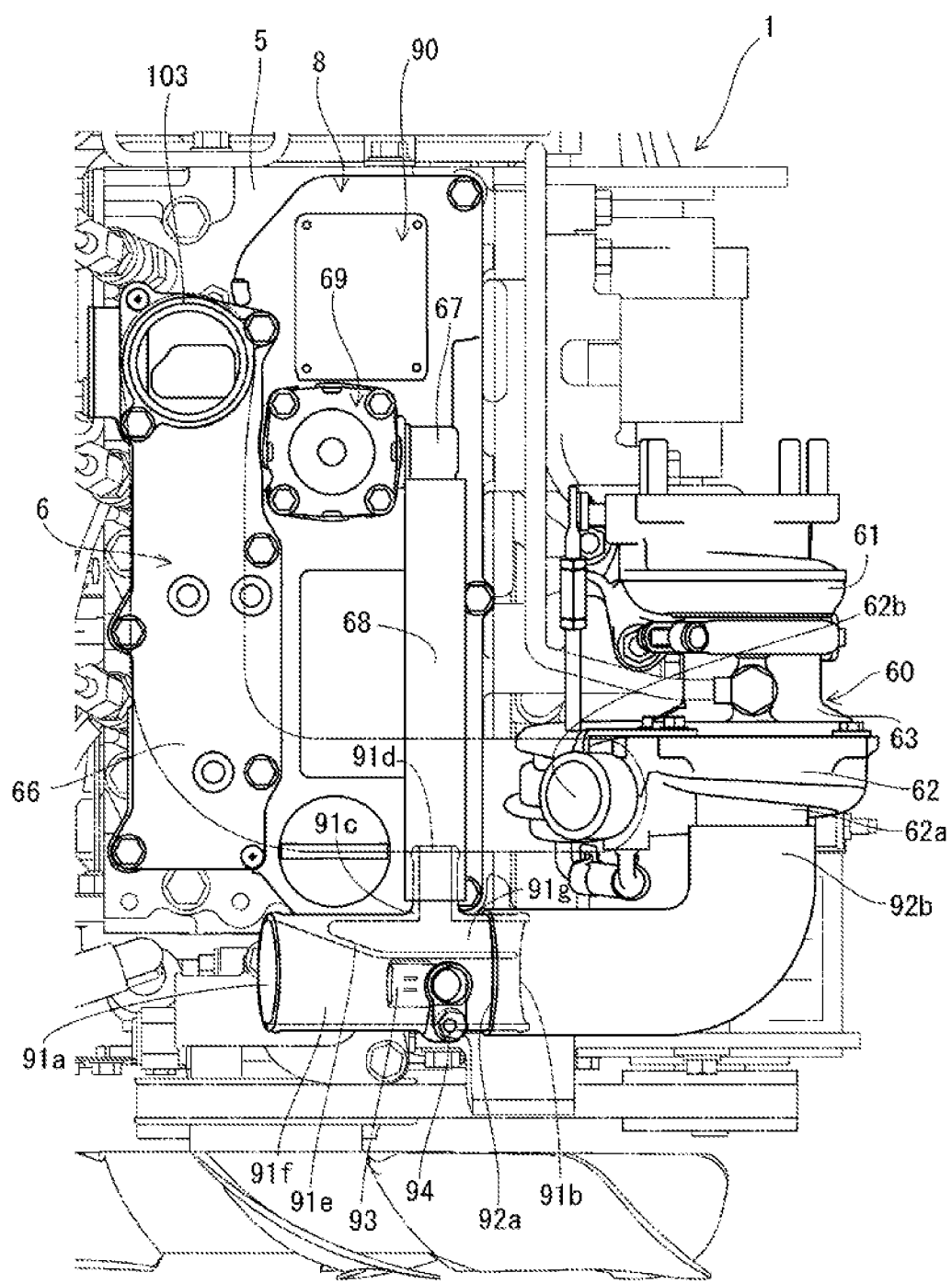
FIG. 15 A plan view illustrating a configuration of an intake pipe and its peripheral components.
Figure 16:
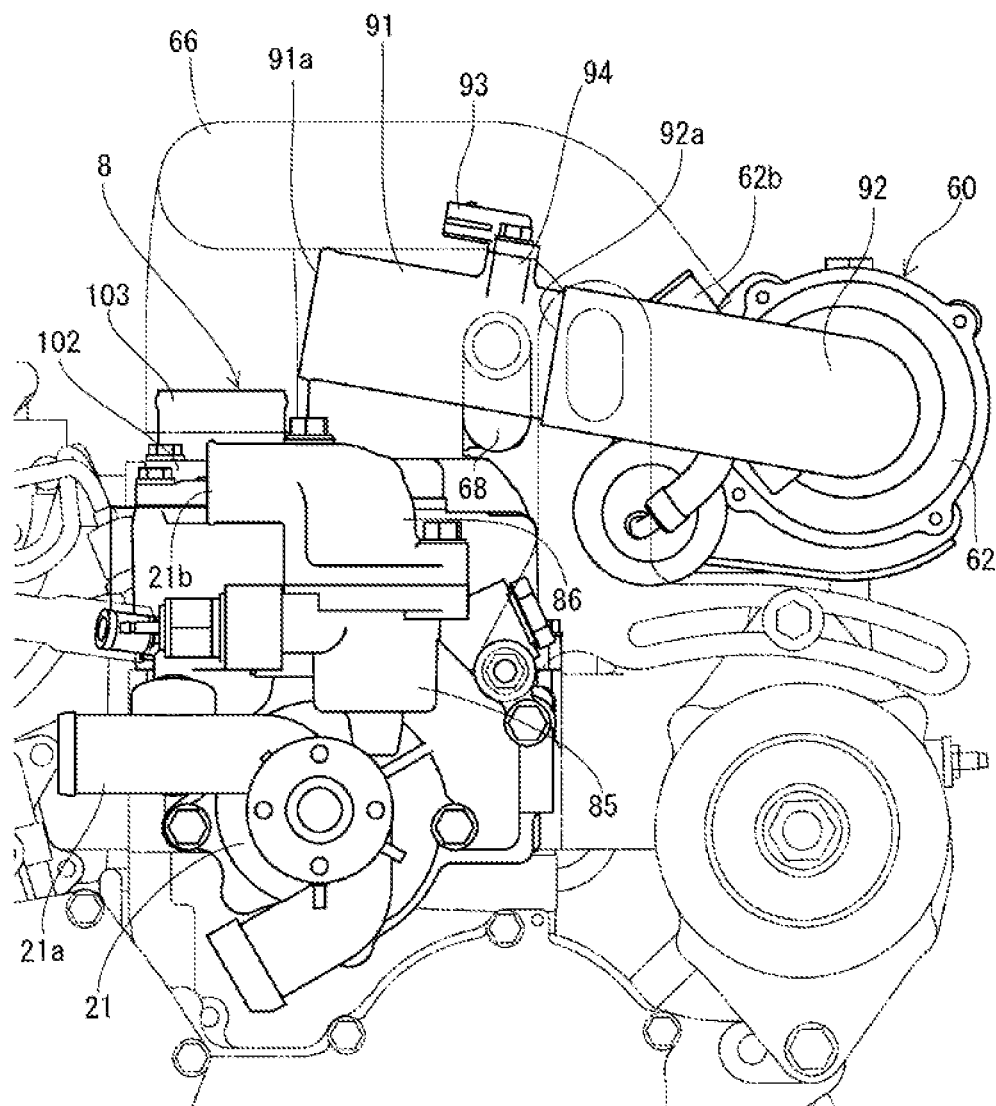
FIG. 16 A front view illustrating the configuration of the intake pipe and its peripheral components.
Figure 17:
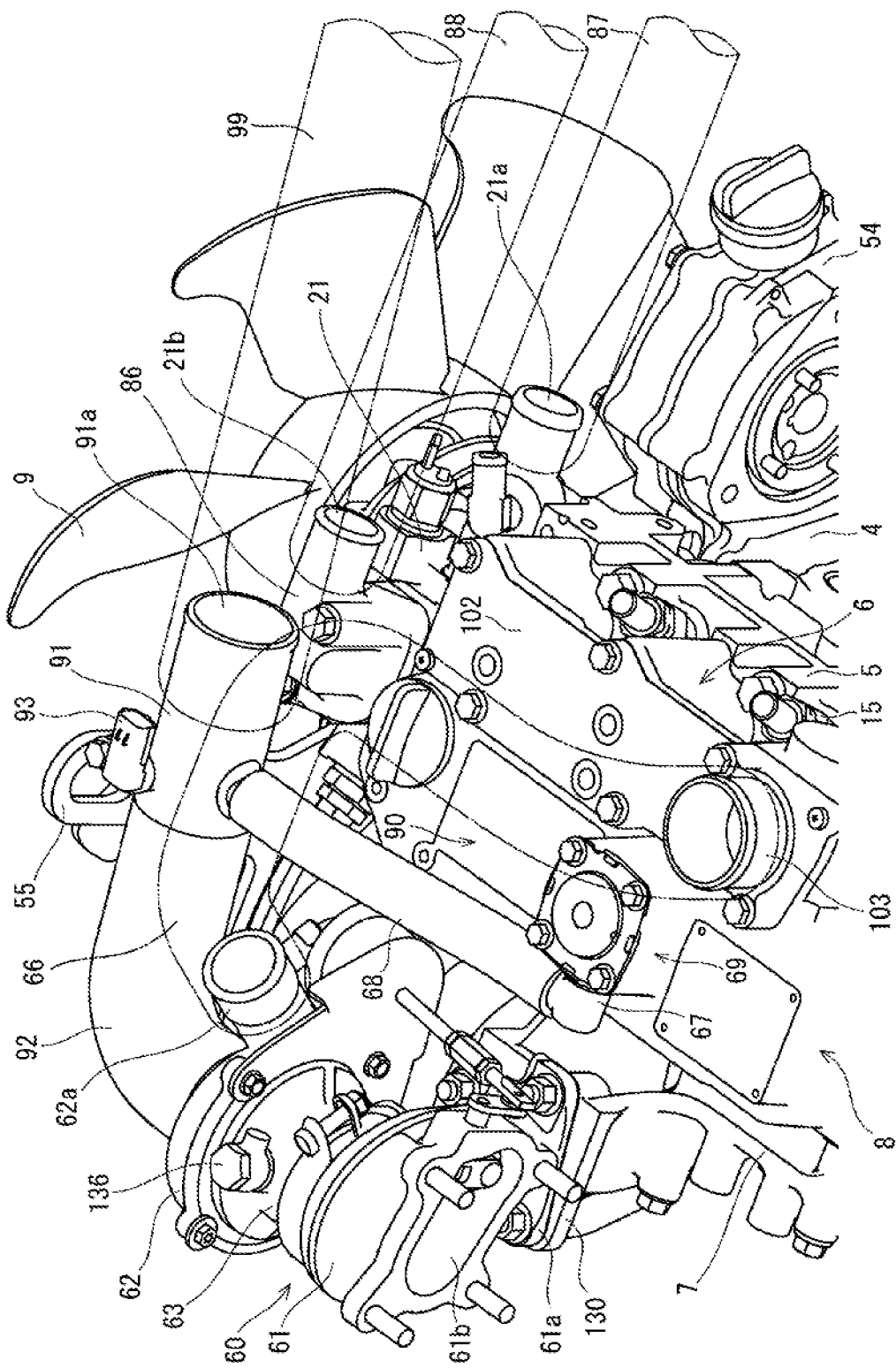
FIG. 17 A perspective view illustrating the configuration of the intake pipe and its peripheral components.
Figure 18:
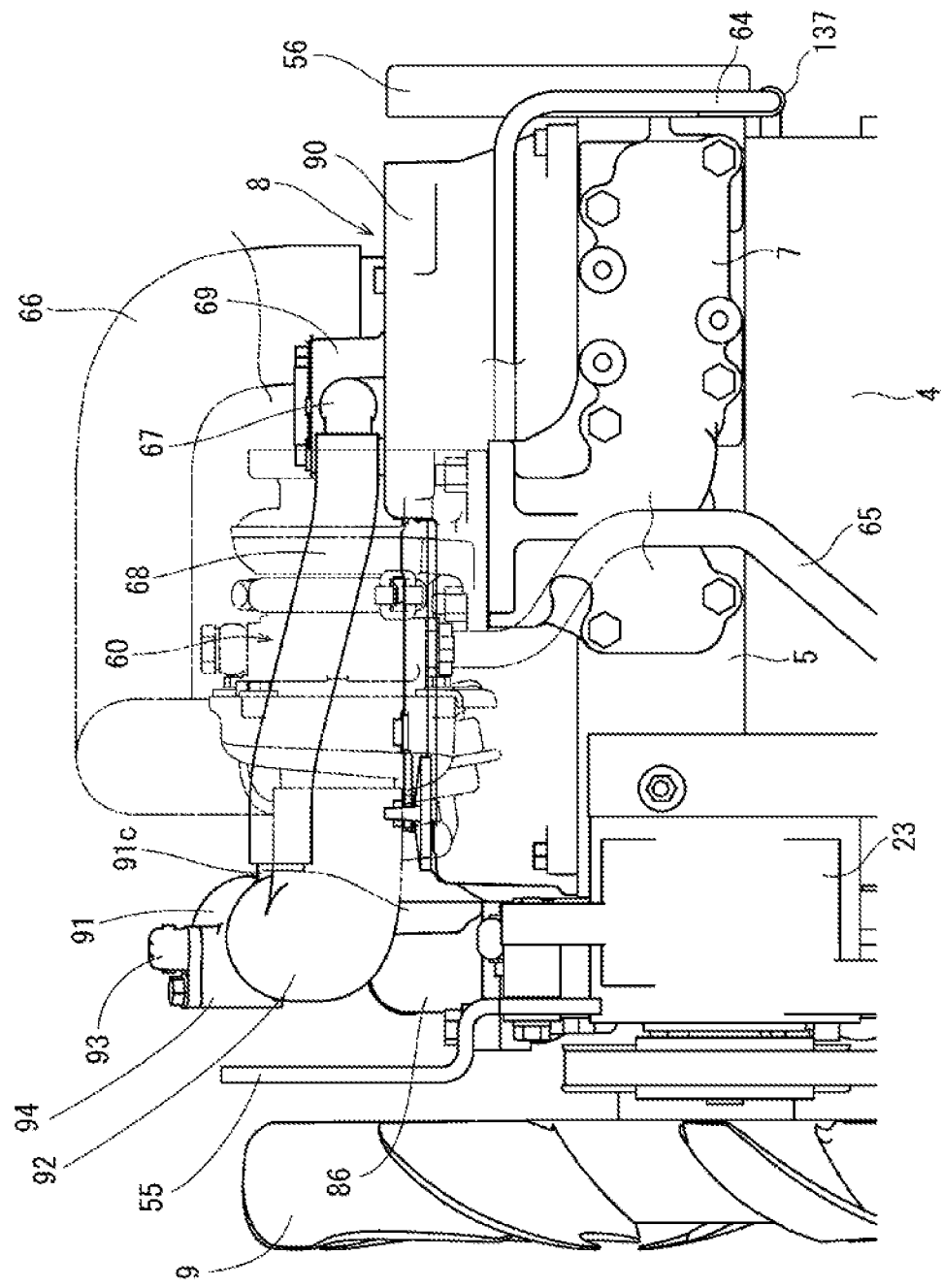
FIG. 18 A perspective view illustrating the rocker-arm-chamber-integrated intake manifold, the intake pipe, and a blowby-gas return pipe.

As illustrated in FIGS. 15 to 17, the intake manifold part 6 having the intake inlet 103 on its upper surface is disposed on the upper surface of the cylinder head 5, and the intake outlet 62b of the turbocharger 60 is opened obliquely upward toward the right side surface of the engine 1. The intake inlet 103 and the intake outlet 62b are connected to each other via the intake relay pipe 66. The intake relay pipe 66 extends obliquely upward from the intake outlet 62b toward the right side surface of the engine 1 to reach a position above the blowby-gas return pipe 68. At the position above the blowby-gas return pipe 68, the intake relay pipe 66 is then curved to extend along a horizontal direction. The intake relay pipe 66 is further guided to a position above a front portion of the intake manifold part 6, and is curved therein toward the rear side of the engine 1. The intake relay pipe 66 is further guided toward a position above the intake inlet 103, and is curved therein downward to be connected to the intake inlet 103.

Thus, in the engine 1, the intake manifold 8 and the turbocharger 60 are disposed at a vertical position higher than the cylinder head 5. Furthermore, the intake outlet 62b of the turbocharger 60 is directed toward the intake manifold 8 and the intake inlet 103 is provided on the upper portion of the intake manifold 8 such that the intake inlet 103 protrudes therefrom. Consequently, as compared with a configuration in which an intake manifold is disposed on a side surface of a cylinder head or with a configuration in which an intake inlet is provided on a side surface of an intake manifold, the engine 1 configured as above can achieve the intake relay pipe 66 having a shorter length, thereby reducing an intake resistance. Consequently, combustion air can be introduced into the engine 1 with a boost pressure as it is achieved by the turbocharger 60, i.e., a boost pressure not impaired. In addition, both of the intake outlet 62b of the turbocharger 60 and the intake inlet 103 of the intake manifold part 6 are opened upward (obliquely upward). With this configuration, positioning of the intake relay pipe 66 is easy, and the workability in attachment of the intake relay pipe 66 is improved.

As illustrated in FIGS. 5, 6, and 15 to 17, the intake relay pipe 66 extends above the intake manifold 8, and passes through a position above the blowby-gas return pipe 68. With this configuration, the intake relay pipe 66 can be placed away from the intake manifold 8, and thus it is possible to suppress or reduce an increase in temperature of combustion air that might otherwise be caused by heat dissipated from the engine 1. At the same time, with this configuration, the intake relay pipe 66 and the blowby-gas return pipe 68 can be placed in a space above the intake manifold 8, and thus this space can be effectively utilized. In addition, the blowby-gas return pipe 68 is placed to extend in a straight line, and thus the length of the blowby-gas return pipe 68 to be installed can be made shorter.

As illustrated in FIGS. 16 and 17, the coolant pump 21 is provided with a thermostat case 85 accommodating a thermostat. Above the thermostat case 85, a thermostat cover 86 is provided. The thermostat cover 86 has a coolant outlet 21b connected to a coolant pipe leading to the radiator 19. The thermostat cover 86 is disposed at a position lower than the first intake pipe 91. The thermostat case 85 and the thermostat cover 86 are a part of the coolant pump 21.

The coolant pump 21 has a coolant inlet 21a and the coolant outlet 21b respectively connected to a coolant feeding pipe 87 and a coolant return pipe 88, each of which leads to the radiator 19 (see FIGS. 3 and 4). The coolant inlet 21a is provided to the main body of the coolant pump 21. The coolant outlet 21b is provided to the thermostat cover 86. Both of the coolant inlet 21a and the coolant outlet 21b are opened toward the right side surface of the engine 1.

As illustrated in FIG. 16, the upstream-side portion of the series of intake pipes 91 and 92 is inclined upward from a location close to the left side surface of the engine 1 toward the right side surface of the engine 1. With this configuration, it is possible to achieve, at a location below the upstream-side portion of the intake pipes 91 and 92, a space for installing another component of the engine 1, specifically, the thermostat cover 86 provided with the coolant outlet 21b in the present embodiment, without the need to increase a vertical position of the intake inlet 62a of the turbocharger 60, hence, without the need to increase a vertical position of the turbocharger 60 itself, but with a compact configuration in which a vertical position of the turbocharger 60 is suppressed or reduced. In addition, with the above-described configuration, it is possible to provide a large space between the fresh-air inflow port 91a of the upstream-side portion of the intake pipes 91 and 92 and another component disposed below the fresh-air inflow port 91a, specifically, the thermostat cover 86 in the present embodiment. Thus, the space that an operator can access to attach/detach the fresh-air pipe 99 leading to the air cleaner (not illustrated) to/from the fresh-air inflow port 91a of the first intake pipe 91 can be achieved. This facilitates the attachment/detachment work.

In addition, in the engine 1 of the present embodiment, the fresh-air inflow port 91a of the first intake pipe 91 and the coolant inlet 21a and the coolant outlet 21b of the coolant pump 21 are opened toward the right side of the engine 1. Consequently, an attachment work and a maintenance work of the fresh-air pipe 99 to be connected to the fresh-air inflow port 91a, the coolant feeding pipe 87 to be connected to the coolant inlet 21a, and the coolant return pipe 88 to be connected to the coolant outlet 21b can be performed from a single side face of the engine 1 (the right side surface of the engine 1, in the present embodiment). Consequently, workability in these works is improved.

Figure 19:
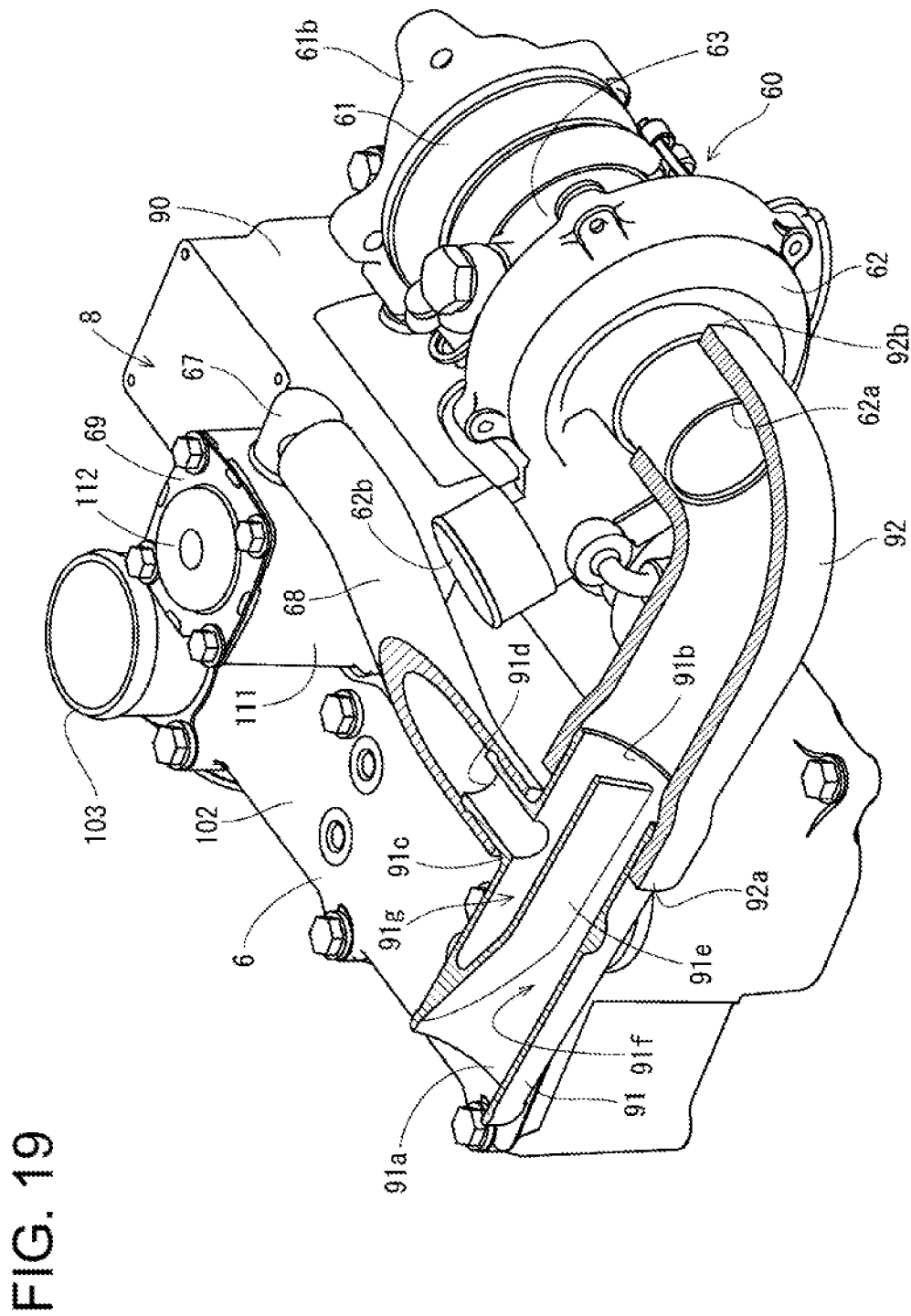
FIG. 19 A perspective cross-sectional view of the intake pipe and the blowby-gas return pipe.
Figure 21:
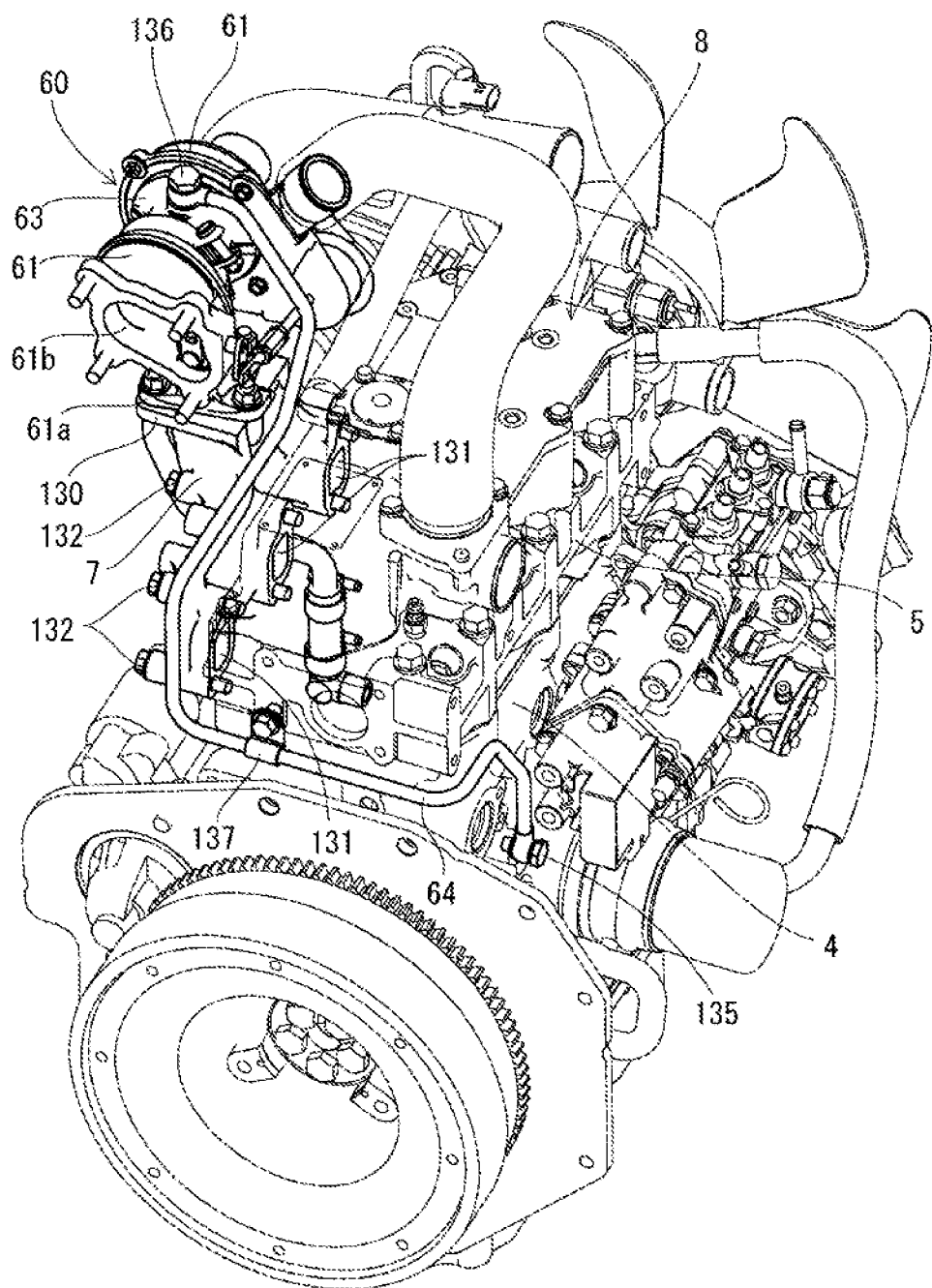
FIG. 21 A perspective view of the components of the exhaust system.
Figure 22:
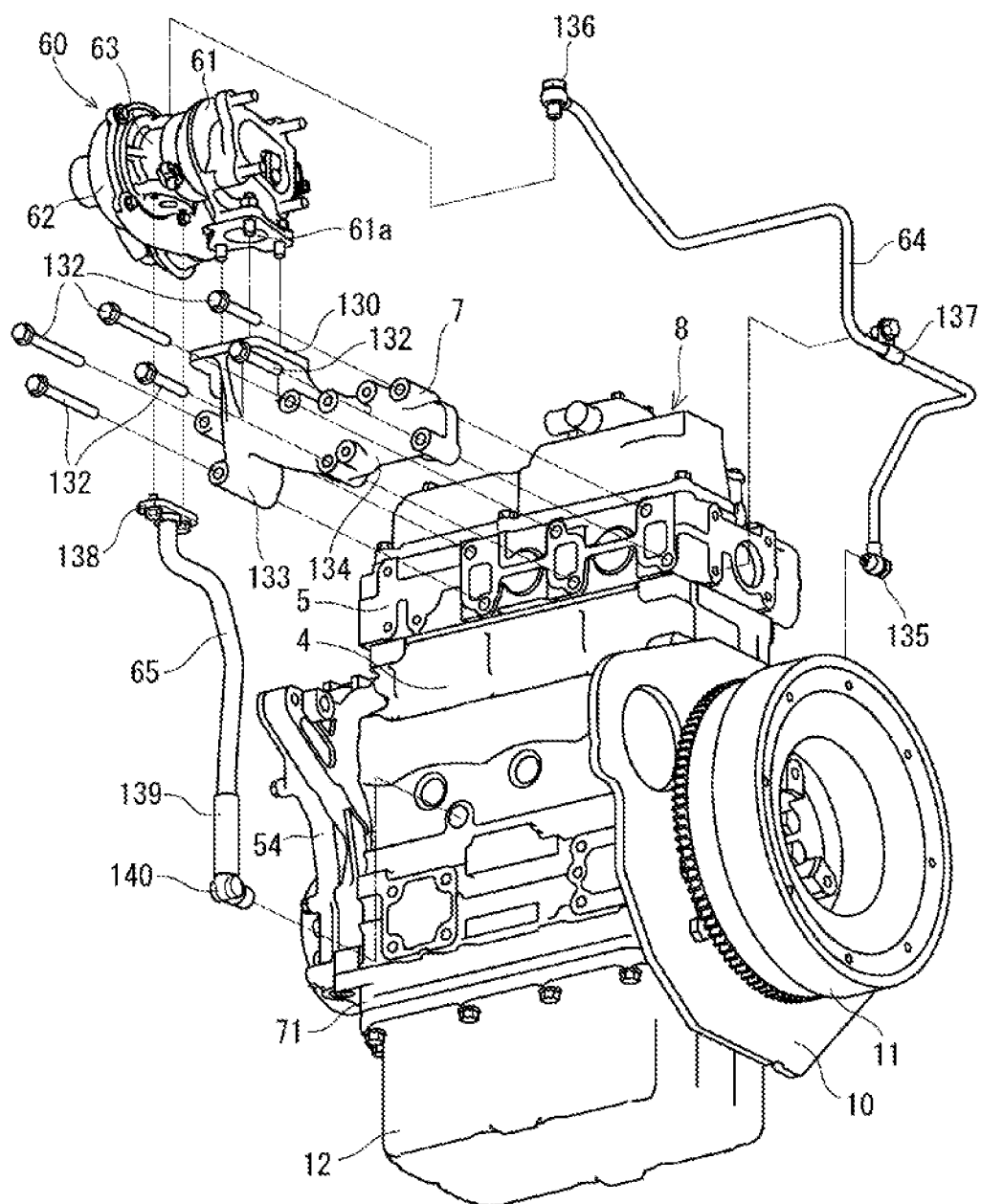
FIG. 22 An exploded perspective view illustrating a mounting structure for the components of the exhaust system.

As illustrated in FIGS. 15 and 19, the first intake pipe 91 includes, in its inside, a partitioning wall 91e. The partitioning wall 91e extends from the fresh-air inflow port 91a toward the fresh-air outflow port 91b, and partitions the internal space of the first intake pipe 91 into a fresh-air flowing space 91f extending from the fresh-air inflow port 91a to the fresh-air outflow port 91b and a blowby-gas flowing space 91g extending from the blowby-gas inflow port 91d to the fresh-air outflow port 91b. Due to such a structure, the first intake pipe 91 may also be called a three-way valve. Such a structure of the first intake pipe 91 can suppress or reduce a phenomenon that blowby gas introduced from the blowby-gas inflow port 91d into the first intake pipe 91 flows back to the fresh-air inflow port 91a.

As illustrated in FIGS. 15 and 17, the first intake pipe 91 is provided with a sensor mounting pedestal 94 on which a temperature sensor 93 is to be mounted, in the example of the present embodiment. The temperature sensor 93 is attached to the sensor mounting pedestal 94 such that a sensor portion of the temperature sensor 93 is disposed inside the first intake pipe 91. The temperature sensor 93 is configured to measure a temperature of air flowing through the fresh-air flowing space 91f. The sensor portion of the temperature sensor 93 is disposed in the fresh-air flowing space 91f, which is separated from the blowby-gas flowing space 91g. This configuration can prevent the sensor portion from being stained by a lubrication oil component and/or the like contained in blowby gas.

Next, with reference to FIGS. 20 to 23, a configuration of components of the exhaust system and its peripheral components will be described. To the exhaust gas outlet 130 (exhaust-side outlet) disposed on the upper surface of the exhaust manifold 7, the exhaust inlet 61a of the turbocharger 60 is connected. The exhaust manifold 7, which has exhaust gas inlets 131 provided for the respective three cylinders, is fixed to the left side surface of the cylinder head 5 by six mounting bolts 132. The exhaust manifold 7 has, for each of the peripheries of the exhaust gas inlets 131, two bolt insertion holes by which a corresponding one of the exhaust gas inlets 131 is sandwiched in the top-and-bottom direction. The exhaust manifold 7 has a bottom surface that is bifurcated, under the exhaust gas outlet 130, into a front branched portion 133 and a rear branched portion 134. The front branched portion 133 has an exhaust gas inlet 131 for one cylinder, and the rear branched portion 134 has exhaust gas inlets 131 for two cylinders.

To the center housing 63 of the turbocharger 60, the lubrication-oil feeding pipe 64 and a lubrication-oil return pipe 65 are connected. The lubrication-oil feeding pipe 64 has a first end connected to the lubrication-oil feeding passage 79 (see FIG. 23) inside the cylinder block 4 via a lubrication-oil introduction joint 135, at a location close to a rear-side portion of the center of the right side surface of the cylinder block 4. The lubrication-oil feeding pipe 64 has a second end connected to an upper portion of the center housing 63 via a lubrication-oil discharge joint 136.

On the right side of the cylinder block 4, the lubrication-oil feeding pipe 64 is guided upward from the lubrication-oil introduction joint 135, and is then bent obliquely rearward and upward to be guided to a location close to a rear-side portion of the upper end of the right side surface of the cylinder block 4. The lubrication-oil feeding pipe 64 is further guided, along the upper edge of the cylinder block 4, from the right side surface of the cylinder block 4 toward the left side surface of the cylinder block 4 through the rear side surface of the cylinder block 4. The lubrication-oil feeding pipe 64 has an intermediate portion fixed by a pipe locking member 137 that is fastened to the cylinder head 5 by a bolt, at a position facing the upper end of the rear side surface of the cylinder block 4. The lubrication-oil feeding pipe 64 guided to the left side of the cylinder block 4 is bent upward at a location behind the exhaust manifold 7, and is then guided to a position higher than the upper surface of the cylinder head 5 and is bent forward. The lubrication-oil feeding pipe 64 is further guided, through a position above the rear branched portion 134 of the exhaust manifold 7, to a position between the exhaust gas outlet 130 and the left side surface of the intake manifold 8. The lubrication-oil feeding pipe 64 is guided, from the position, obliquely forward and upward, and is then bent obliquely upward and leftward. The lubrication-oil feeding pipe 64 is further bent to extend in a substantially horizontal direction, and is connected to the lubrication-oil discharge joint 136, which is attached to the center housing 63 of the turbocharger 60.

In the above-described manner, the lubrication-oil feeding pipe 64 is installed such that the lubrication-oil feeding pipe 64 extends from the right side surface of the engine 1 toward the left side surface of the engine 1, while making a detour by extending along the rear side surface of the engine 1, and the lubrication-oil feeding pipe 64 further extends, over the left side surface of the engine 1, from the rear side of the exhaust manifold 7 toward a position above the exhaust manifold 7, while making a detour by extending along an outer periphery of the exhaust manifold 7. Thus, the lubrication-oil feeding pipe 64 is compactly arranged along the side surfaces of the engine 1. In addition, since the lubrication-oil feeding pipe 64 is installed such that the lubrication-oil feeding pipe 64 makes a detour by extending along the outer periphery of the exhaust manifold 7, the lubrication-oil feeding pipe 64 would not become an obstacle to an attachment work of the exhaust manifold 7 even in a state where the lubrication-oil feeding pipe 64 is attached to the engine 1 with the lubrication-oil introduction joint 135 and the pipe locking member 137. Thus, this configuration improves efficiency in assembling of the engine 1.

The lubrication-oil return pipe 65 has a first end connected to a pipe flange member 138 fastened by a bolt to a lower portion of the center housing 63, and has a second end connected to a lubrication-oil return joint 140 via an elastic pipe member 139 that is made of, e.g., a rubber resin and is elastic. The lubrication-oil return pipe 65 is guided downward from the pipe flange member 138, and is then bent obliquely rearward and downward. The lubrication-oil return pipe 65 is guided to a location that is on the left side of the exhaust manifold 7 and is below the exhaust gas outlet 130. The lubrication-oil return pipe 65 is further guided, along the left side surface of the exhaust manifold 7, obliquely rightward, downward, and toward a branch at which the front branched portion 133 and the rear branched portion 134 are branched off. The lubrication-oil return pipe 65 is then bent, at a location below the exhaust manifold 7, obliquely forward, downward, and rightward, so that the lubrication-oil return pipe 65 is guided to a location close to the left side surface of the cylinder block 4. The lubrication-oil return pipe 65 is further bent downward to be connected to a first end of the elastic pipe member 139. The elastic pipe member 139 has a cylindrical shape, and is positioned along a vertical direction. The elastic pipe member 139 has a second end connected to the lubrication-oil return joint 140, which is disposed at a location between the center of the right side surface of the cylinder block 4 and the front side of the right side surface of the cylinder block 4. The lubrication-oil return joint 140 is disposed under the center housing 63, in a left side view.

In the engine 1 of the present embodiment, the lubrication-oil return pipe 65 for collecting lubrication oil from the turbocharger 60 is installed such that the lubrication-oil return pipe 65 extends downward along the bifurcated portion on the bottom surface of the exhaust manifold 7. With this configuration, the lubrication-oil return pipe 65 can be positioned close to the left side surface of the engine 1, and thus can be installed compactly.

Incidentally, in order to meet recent market demands such as the need for lower fuel consumption and lower cost, internal combustion engines provided with a turbocharger have been made more and more compact. Thus, the production quantity of a small-displacement engine with a turbocharger is expected to increase greatly. On the other hand, the number of types of small-displacement industrial diesel engines with a turbocharger and the production quantity thereof have been traditionally small. In a case where a turbocharger is mounted in an engine of this type, assembling of the peripheral components of the turbocharger has been performed by the steps of assembling an exhaust manifold, a turbocharger, and a lubrication oil pipe in the procedure for assembling a naturally aspirated engine. Namely, the peripheral components of the turbocharger are assembled in an assembly cell dedicated to the turbocharger after being transferred thereto from the assembly line, which takes a long time. Thus, the traditional assembling method, which takes a long time, cannot satisfy the production quantity as requested.

Figure 20:
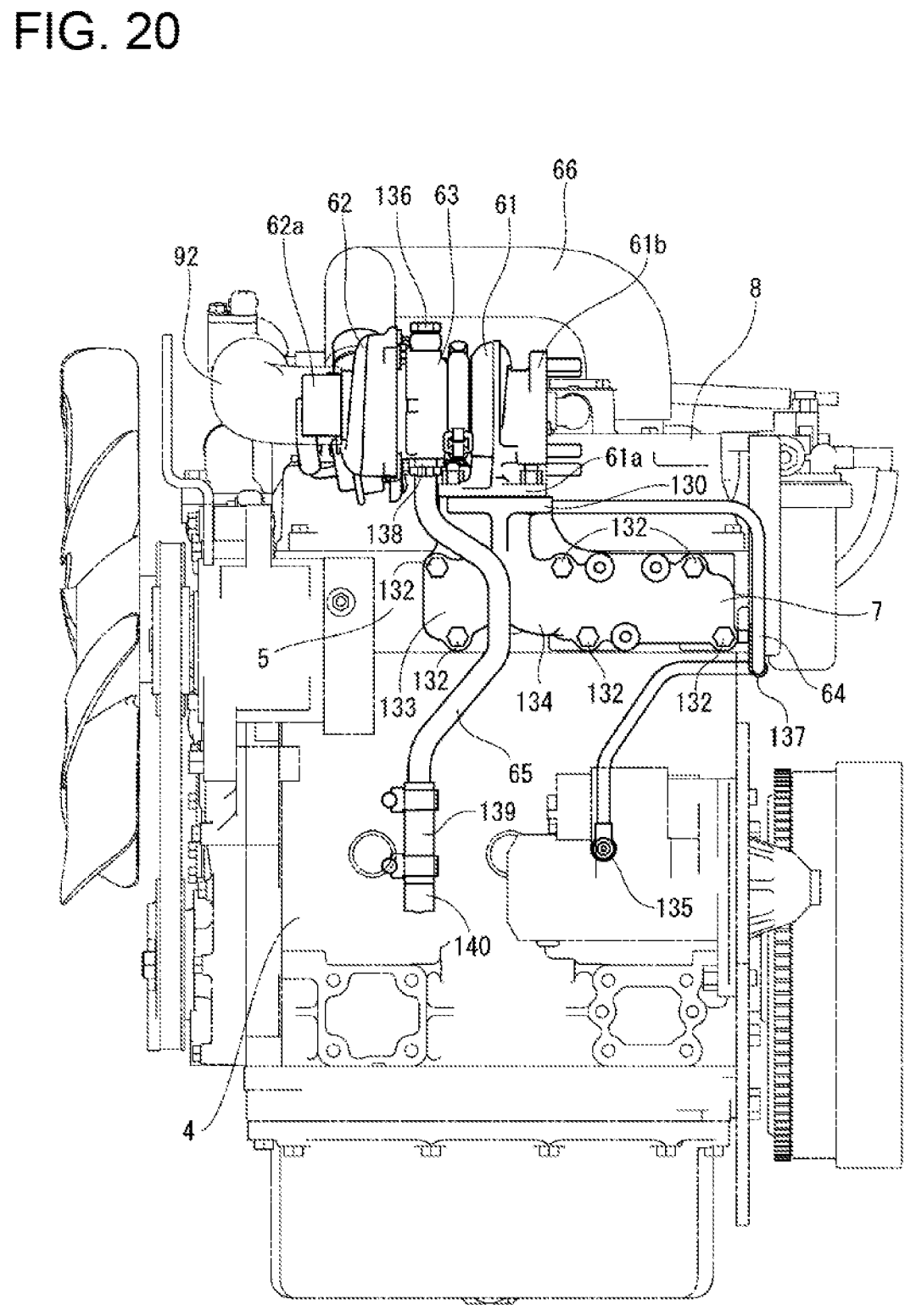

In order to meet such a demand, the engine 1 of the present embodiment has been improved so that assembling of the engine 1 can be performed with the exhaust manifold 7, the turbocharger 60, and the lubrication-oil return pipe 65 being preliminarily assembled. As illustrated in FIG. 20, the components of the exhaust manifold 7, the turbocharger 60, and the lubrication-oil return pipe 65 are arranged with mounting bolts 132 being exposed when viewed from the left side surface of the engine 1, in order not to hinder attachment of the exhaust manifold 7 to the cylinder head 5. In addition, the lubrication-oil return pipe 65 is connected to the lubrication-oil return joint 140 via the elastic pipe member 139 so that the bolts of the exhaust manifold 7 can be fastened by a single operator with the exhaust manifold 7, the turbocharger 60, and the lubrication-oil return joint 65 being preliminarily assembled. By first connecting the lubrication-oil return joint 140 to the cylinder block 4, the operator can use, as a support for the assembling work, the lubrication-oil return pipe 65, the elastic pipe member 139, and the lubrication-oil return joint 140. In addition, it is possible to prevent an irreversible plastic deformation from occurring in the lubrication-oil return pipe 65, since the elastic pipe member 139 is deformable.

Consequently, it becomes easier for a single operator to assemble, to the engine 1, the preliminarily assembled components of the exhaust manifold 7, the turbocharger 60, and the lubrication-oil return pipe 65, and it is possible to assemble these components of the exhaust system in advance according to the manufacturing schedule. This can provide a centralized assembling work and a streamlined manufacturing line work. Moreover, with a minimum increase in the number of assembling steps on the manufacturing line, it is possible to reconfigure a naturally aspirated engine to an engine with a turbocharger. Thus, the present embodiment can meet the need for an increase of production quantity. In addition, the assembling steps to be performed in an assembling space dedicated for the engine with the turbocharger can be limited only to the steps of attachment of the preliminarily assembled components of the exhaust manifold 7, the turbocharger 60, and the lubrication-oil return pipe 65 and the components of the exhaust system, such as the lubrication-oil feeding pipe 64. This can save the space of the assembling site.

Incidentally, recently, a space for mounting a diesel engine is often limited (i.e., small) to meet the demands for weight reduction and downsizing, although the space for mounting the engine varies depending on the work vehicle (e.g., a construction machine or an agriculture machine) on which the diesel engine is to be mounted. In view of this, components of the diesel engine need to be arranged compactly. Especially for a small work vehicle such as a lawn mower, a transplanter, a small tractor, it is necessary to mount a high-output engine in a small engine mounting space.

By mounting turbocharger in a diesel engine with a small number of cylinders, it is possible to achieve a higher output. In such a configuration, however, it is necessary to control an amount and a timing of fuel injection performed by a fuel injection pump in a highly accurate manner. In order to achieve a high-level fuel injection control, a fuel injection pump with an electronically-controlled speed-governing mechanism may be employed. However, this requires an actuator larger than the body of the speed-governing mechanism. Thus, applying this configuration to a diesel engine with a small number of cylinders would result in a limited space for mounting the fuel injection pump in the diesel engine. Furthermore, the electronically-controlled speed-governing mechanism is susceptible to vibrations from the engine body, disadvantageously. In order to address this, the engine 1 of the present embodiment is configured such that the effects on the speed-governing mechanism given by vibrations from the engine can be reduced.

With reference to, e.g., FIGS. 23 to 28, a configuration of components of the fuel system and its peripheral components will be described. As illustrated in FIGS. 23 to 28, in the engine 1, the turbocharger 60 is mounted above the exhaust manifold 7 disposed at a location close to the left side surface of the engine 1, and the fuel injection pump device 14 disposed at a location close to the right side surface of the engine 1 supplies fuel to the injectors 15 inserted into the cylinder head 5. The fuel injection pump device 14 has a rear end provided with an electronically-controlled speed-governing mechanism 30. The rear end of the fuel injection pump device 14 is fixed to the right side surface of the cylinder block 5 via the fixing bracket 41, and a front end of the fuel injection pump device 14 is connected to and fixed to the gear case 54 being disposed at a front edge of the cylinder block 4 and having a flange shape. The intake manifold 8 is mounted on the upper surface of the cylinder head 5, and the injectors 15 are disposed at the injector mounting recesses 125 located in the right-side portion (intake manifold part 6) of the intake manifold 8. The intake manifold 8 and the injectors 15 are connected to each other through the fuel injection pump device 14 and fuel pipes (e.g., the fuel injection pipes 36).

The fuel injection pump device 14 includes the injection pump body 32 that internally includes fuel pressure-feed mechanisms 201 (provided respectively for the three cylinders, in the present embodiment) and a camshaft 202. The fuel pressure-feed mechanisms 201 are configured to forcibly feed fuel to the injectors 15 via the fuel injection pipes 36, respectively. The camshaft 202 is configured to drive, by driving power from the engine 1, the fuel pressure-feed mechanisms 201 provided respectively for the cylinders. Each of the fuel pressure-feed mechanisms 201 includes a plunger barrel 212 internally including a plunger (not illustrated) that is slidable, a delivery pipe joint (delivery barrel) 213 communicating with an upper portion of the plunger barrel 212, a control sleeve 214 externally fitted to the plunger barrel 212 and configured to rotate integrally with the plunger barrel 212, and a spring body 215 configured to bias the plunger toward the camshaft 212. The camshaft 212 pivotally supports cams 221 which are eccentric cams and whose peripheral surfaces are in contact with lower ends of the fuel pressure-feed mechanisms 202 provided respectively for the cylinders.

The plungers in the plunger barrels 212 are biased toward the camshaft 202 by the spring bodies 215, and are caused to move up and down according to the positions of the peripheral surfaces of the cams 221, the positions being changed by rotation of the camshafts 202. The delivery pipe joints 213 have delivery valves (not illustrated) in their lower ends (ends close to the plunger barrels 212). The delivery pipe joints 213 have, in their upper ends, fuel delivery outlets 203 communicating with the fuel injection pipes 36. The control sleeves 214 configured to rotate integrally with the plungers have, on their outer peripheries, pinion gears that are engaged with a rack gear on a control rack 204 slidable in the front-and-rear direction.

Forcible feeding of fuel is performed as follows. That is, after the plungers slide downward and fuel is supplied into the plunger barrels 212, the plungers slide upward to close port holes of the plunger barrels 212. This increases internal pressures of fuel chambers in the plunger barrels 212. Consequently, the delivery valves at the lower ends of the delivery pipe joints 213 are opened. Thus, fuel is discharged from the fuel delivery outlets 203, and is forcibly fed to the injectors 15 through the fuel injection pipes 36.

Thereafter, the plungers slide further upward to be fitted to the port holes of the plunger barrels 212, so that fuel flows out of the port holes. Consequently, internal pressures of the fuel chambers in the plunger barrels 212 drop, and accordingly the delivery valves at the lower ends of the delivery pipe joints 213 are closed. Thus, the forcible feeding of the fuel ends. During this operation, by causing the control rack 204 to slide in the front-and-rear direction to rotate the plungers together with the control sleeves 214, timings at which the valves of the delivery pipe joints 213 are closed are set, and accordingly amounts (fuel injection amounts) of fuel to be fed to the injectors 15 are set.

The fuel injection pump device 14 is disposed on the right side of the cylinder head 5 such that the fuel delivery outlets 203 are positioned above the upper surface of the cylinder head 5. The injectors 15 are disposed at the injector mounting recesses 125 on the right side surface of the intake manifold 8, which is mounted on the upper surface of the cylinder head 5, and at a portion close to a rear right portion of the intake manifold 8. The injectors 15 are connected to the fuel delivery outlets 203 through the fuel injection pipes 36, respectively. In this manner, the fuel delivery outlets 203 can be disposed close to the injectors 15, and thus the lengths of the fuel injection pipes 36 to be installed can be made shorter. With this configuration, a pressure for forcibly feeding fuel from the fuel injection pump device 14 to the injectors 15 can be kept at a high pressure. Accordingly, the injectors 15 inject fuel with good response, so that a combustion efficiency can be enhanced. Thus, this configuration can improve fuel economy, and can also suppress or reduce generation of graphite and/or NOx.

The intake outlet 62b of the turbocharger 60 extends obliquely upward toward a position above the cylinder head 5, and communicates, through the intake relay pipe 66, with the intake inlet 103 provided in the upper portion of the intake manifold 8 (intake manifold part 6). Consequently, the intake relay pipe 66 is installed at a position higher than positions at which the injectors 15 are positioned. In addition, the position of the intake relay pipe 66 is closer to the left side (closer to the exhaust manifold 7) than the positions of the injectors 15. Thus, a space between the fuel injection pump device 14 and the injectors 15 has no obstacle to an installation work of the fuel injection pipes 36. This configuration can facilitate the installation work of the fuel injection pipes 36, which has been a troublesome work. Consequently, the workability in the assembling work can be improved. In addition, with this configuration, the fuel injection pipes 36 do not have to be bent more than necessary, and thus can maintain adequate rigidity against high-pressure fuel that passes through the inside of the fuel injection pipes 36.

The fuel injection pump device 14 includes the injection pump body 32 having a rear end provided with the electronically-controlled speed-governing mechanism 30. The speed-governing mechanism 30 includes the speed-governing linkage 205 configured to cause the control rack 204 to slide in the front-and-rear direction and the actuator 34 coupled to the control rack 204 via the speed-governing linkage 205. The speed-governing linkage 205 is provided inside the governor storage case 33, which is fixed to a rear surface of the injection pump body 32. The speed-governing linkage 205 is coupled to a first end of the control rack 204, which is inserted into the governor storage case 33 from the injection pump body 32. The control rack 204 is inserted into an upper portion inside the governor storage case 33, and is coupled to an upper end of the speed-governing linkage 205.

The actuator 34 is fixed to a lower portion of a rear end surface of the governor storage case 33. In the governor storage case 33, the speed-governing linkage 205 and a movable member (not illustrated) protruding from a front surface of the actuator 34 are coupled to each other. The governor storage case 33 has a rear surface provided with a cam rotation sensor 206 for measuring a rotational speed of the camshaft 202. Based on a measurement signal from the cam rotation sensor 206, a controller (not illustrated) drives the actuator 34 to set a rack position of the control rack 204.

The injection pump body 32 has, in a lower portion of its front end surface, a coupling flange 231 coupled to the gear case 54. The coupling flange 231 is disposed at a location lower than the upper end of the cylinder block 4. The governor storage case 33 in the speed-governing mechanism 30 has coupling pedestals (coupling portion) 232 on the rear end surface of the governor storage case 33 and above the actuator 34, the coupling pedestals 232 being to be coupled to the fixing bracket 41. The coupling pedestals 232 are disposed above the upper end of the cylinder block 4. Namely, the fuel injection pump device 14 is coupled to the gear case 54 at a lower portion of a front end surface of the fuel injection pump device 14, and is coupled to the cylinder head 5 at an upper portion of a rear end surface of the fuel injection pump device 14. Thus, the fuel injection pump device 14 is fixed to the engine 1 at positions on a diagonal line of the engine 1.

The coupling flange 231, which is attached at the front end surface of the injection pump body 32, has a shape expanding outwardly from its center that is the camshaft 202. The coupling flange 231 has a plurality of elongated holes 233 bored therein and arranged circumferentially at equal intervals. The elongated holes 233 have shapes conformed to an outer periphery of the coupling flange 231 around the camshaft 202. Fixing pins 234 fixed to the gear case 54 are inserted into the elongated holes 233 of the coupling flange 231, and nuts 235 are screwed into the fixing pins 234, respectively. Consequently, the front end surface of the injection pump body 32 is fastened to the gear case 54. In this state, the elongated holes 233 of the coupling flange 231 are loosely fitted to the fixing pins 234 inserted into the gear case 54. Thus, the front portion of the fuel injection pump device 14 is fastened such that the front portion of the fuel injection pump device 14 is turnable around the axial center of the camshaft 202 for adjustment.

The fixing bracket 41 is bent into an L-shape constituted by a proximal-end portion 241 coupled to the cylinder head 5 and a fixed portion 242 coupled to the governor storage case 33. The proximal-end portion 241 of the fixing bracket 41 is fastened by bolts 243 to the right side surface of the cylinder head 5 at multiple positions (two positions, in the present embodiment) that are shifted from each other in the front-and-rear direction and the top-and-bottom direction. The fixed portion 242 of the fixing bracket 41 has elongated holes 244 at multiple positions (two positions, in the present embodiment). Bolts 245 inserted into the elongated holes 244 are screwed into the coupling pedestals 232, respectively. Consequently, the rear end surface of the governor storage case 33 is fastened to the fixing bracket 41.

The elongated holes 244 of the fixed portion 242 are bored in the fixing bracket 41 such that the elongated holes 244 are arranged circumferentially around the camshaft 202. The elongated holes 244 of the fixing bracket 41 are loosely fitted to the bolts 245 screwed into the coupling pedestals 232. Thus, the rear portion of the fuel injection pump device 14 is fastened by the bolts 245 such that the rear portion of the fuel injection pump device 14 is turnable around the axial center of the camshaft 202 for adjustment. The fixing bracket 41 is configured such that lower edges of the proximal-end portion 241 and the fixed portion 242 are at a substantially identical vertical position to that of the lower end surface of the cylinder head 5. Thus, the fixing bracket 41 is coupled to the rear end surface of the governor storage case 33 at the location at which the fixing bracket 41 and the actuator 34 do not interfere with each other. Therefore, the actuator 34 does not need to be reconfigured to a new one to be coupled to the cylinder head 5. Thus, an actuator 34 to be attached to the cylinder head 5 can be selected according to the performance of the engine 1.

With the configuration in which the rear portion of the fuel injection pump device 14 is coupled to the cylinder block 5 via the fixing bracket 41, the actuator 34 disposed at the rear portion of the fuel injection pump device 14 is supported by the cylinder head 5, which is less affected by vibrations from the engine 1 than is the cylinder block 4. Consequently, it is possible to reduce the effects given to the actuator 34 by vibrations from the engine 1. Accordingly, it is possible to suppress or reduce an erroneous operation of the speed-governing mechanism 30, thereby making it possible to prevent an excess amount of fuel or an insufficient amount of fuel from being injected. In addition, with the configuration in which the front and rear portions of the proximal-end portion 241 extending in the front-and-rear direction are fastened to the cylinder head 5 by the bolts 243 positioned in the top-and-bottom direction, the proximal-end portion 241 is coupled to the cylinder head 5, which is a highly rigid component, via a wider surface. Therefore, the fuel injection pump device 14 can be supported rigidly.

Furthermore, in the injection pump body 32, the control rack 204 extends in the front-and-rear direction at a vertical position coinciding with a boundary position between the cylinder head 5 and the cylinder block 4. Namely, the fixing bracket 41 has a lower edge positioned at a vertical position substantially equal to a vertical position at which the control rack 204 is disposed. By rigidly supporting the upper portion of the fuel injection pump device 14 by the cylinder head 5, to which relatively small vibrations are applied, it is possible to suppress or reduce occurrence of bending and/or deflection of the control rack 204 that might otherwise be caused by vibrations from the engine 1. With the configuration in which transmission of vibrations from the engine 1 to the fuel injection pump device 14 is suppressed or reduced and the control rack 204 is disposed above such a fuel injection pump device 14, forward and rearward movements of the control rack 204 can be regulated in a stable manner. Consequently, a fuel injection amount set according to the rack position of the control rack 204 can be kept at a target value. Thus, it is possible prevent an excess amount of fuel or an insufficient amount of fuel from being injected into the combustion chambers.

The lubrication-oil introduction joint 135 connected to the lubrication-oil feeding passage (lubrication-oil conduit) 79 inside the cylinder block 4 is disposed between the actuator 34 and the cylinder block 4. The lubrication-oil feeding pipe (oil feeding pipe) 64, which is connected to the lubrication-oil introduction joint 135 and supplies lubrication oil to the turbocharger 60, is installed such that the lubrication-oil feeding pipe 64 extends from the right side surface of the cylinder block 4 toward the left side surface of the cylinder block 4, while making a detour by extending along the rear side surface of the cylinder block 4. The actuator 34 is fixed so as to be away from the right side surface of the cylinder block 4. Thus, the lubrication-oil feeding pipe 64, which is coupled to the right side surface of the cylinder block 4, can be installed without the lubrication-oil feeding pipe 64 and the fuel injection pump device 14 interfering with each other. This makes it possible to improve the workability in the installation work of the lubrication-oil feeding pipe 64 and the attachment work of the fuel injection pump device 14. In addition, the lubrication-oil feeding pipe 64 is installed such that the lubrication-oil feeding pipe 64 passes through a space between the actuator 34 and the cylinder block 4. Thus, it is possible to prevent breakage of the lubrication-oil feeding pipe 64 that might otherwise be caused by, e.g., an external object colliding with the engine 1, thanks to the actuator 34.

The injection pump body 32 of the fuel injection pump device 14 is connected to a lubrication-oil feeding pipe (oil feeding pipe) 252. The lubrication-oil feeding pipe 252 has a first end connected to the lubrication-oil feeding passage 79 via a lubrication-oil introduction joint 251, at a location between the center of the right side surface of the cylinder block 4 and the front side of the right side surface of the cylinder block 4. The lubrication-oil feeding passage 79 is disposed inside the cylinder block 4, and extends in the front-and-rear direction. The lubrication-oil feeding pipe 252 has a second end connected to a position that is below the injection pump body 32 and is above the camshaft 202, via a lubrication-oil discharge joint 253. The lubrication-oil feeding pipe 252 is installed such that the lubrication-oil feeding pipe 252 makes a detour by extending along an outer periphery of the fuel feeding pump 35. Specifically, the lubrication-oil feeding pipe 252 extends from a location that is behind and below the fuel feeding pump 35 disposed in a lower side of the right side surface of the injection pump body 32, toward a location that is in front of and below the fuel feeding pump 32.

The fuel injection pump device 14 is configured to receive fuel supplied through the fuel filter 17. To the front and rear side surfaces of the cylinder head 5, suspended metal fittings 55 and 56, which make up a pair, are respectively fixed. The fuel filter 17 is fixed to the rear suspended metal fitting 56. The pair of front and rear suspended metal fittings 55 and 56 is disposed on a diagonal line of the cylinder head 5. Thus, the engine 1 can be raised with, e.g., a chain block in a stable manner.

The rear suspended metal fitting 56 has a lower end fastened by a bolt to a right portion of the rear surface of the cylinder head 5. The rear suspended metal fitting 56 has, in a right edge of its upper end, a filter coupling portion 261 to which the fuel filter 17 is fastened by a bolt. The filter coupling portion 261 is disposed in an upper portion of the right side surface of the cylinder head 5. With this configuration, the fuel filter 17 can be positioned at a location which is behind the fuel injection pump device 14, at which the fuel filter 17 does not overlap the fuel injection pump device 14, and which is close to the fuel injection pump device 14. Consequently, it is possible to compactly install the fuel filter 17 and the fuel injection pump device 14 to the engine 1 such that the fuel filter 17 and the fuel injection pump device 14 do not interfere with each other. Also, the lengths of the fuel pipes 37 to 39 via which the fuel filter 17 and the fuel injection pump device 14 communicate with each other can be made shorter. This configuration can facilitate the installation work of the fuel pipes 37 to 39, which has been a troublesome work. This makes it possible to improve the workability in the assembling work.

Note that the configurations of the parts/portions of the present invention are not limited to those in the illustrated embodiments, and can be modified and changed in various ways unless such modifications and changes depart from the scope of the present invention. An engine device according to some aspects of the present invention can be mounted in a work machine, such as a lawn mower, a construction machine, an agriculture machine, or an engine generator.

REFERENCE SIGNS LIST 1 engine
4 cylinder block
5 cylinder head
6 intake manifold part (intake manifold)
7 exhaust manifold
8 rocker-arm-chamber-integrated intake manifold (cylinder head cover)
14 fuel injection pump device
15 injector
30 speed-governing mechanism
36 fuel injection pipe (fuel pipe)
41 fixing bracket
54 gear case
60 turbocharger
61a exhaust inlet (exhaust-side inlet)
62a intake inlet (intake-side inlet)
62b intake outlet (intake-side outlet)
64 lubrication-oil feeding pipe (oil feeding pipe)
66 intake relay pipe
67 blowby-gas discharge port
68 blowby-gas return pipe (gas conduit)
69 positive crankcase ventilation device
90 rocker arm chamber part (rocker arm chamber)
91 first intake pipe
91c connecting part
92 second intake pipe
101 partitioning wall (wall)
102 intake lid
103 intake inlet
111 gas discharge part
113 gas introduction chamber
114 inner passage
116 gas introduction part
118 dividing wall
119 peripheral wall
120 oil trap material
121 beam-shaped dividing wall

The invention claimed is:

1. An engine device comprising:
an exhaust manifold disposed at a location close to a first one of left and right side surfaces of the engine device;
a turbocharger having an exhaust-side inlet connected to the exhaust manifold; and
a cylinder head cover disposed on an upper surface of a cylinder head, the cylinder head cover integrally including a rocker arm chamber and an intake manifold,
wherein:
the cylinder head cover has a wall dividing the rocker arm chamber disposed at a location close to the first one of the left and right side surfaces of the engine device and the intake manifold disposed at a location close to a second one of the left and right side surfaces of the engine device from each other to isolate the rocker arm chamber and the intake manifold from each other, and
the rocker arm chamber has an upper portion provided with a positive crankcase ventilation device which protrudes from the upper portion of the rocker arm chamber and which is configured to return blowby gas to an intake system, the positive crankcase ventilation device has a side surface provided with a blowby-gas discharge port of the cylinder head cover to which a gas conduit is connected, and the blowby gas is delivered to an intake-side inlet of the turbocharger through the gas conduit.

2. The engine device according to claim 1, wherein the intake manifold has an upper surface covered with an intake lid provided with an intake inlet protruding upward from the intake lid, the intake inlet is connected to an intake-side outlet of the turbocharger via an intake relay pipe, and the gas conduit is positioned such that the gas conduit crosses the intake relay pipe.

3. The engine device according to claim 1, wherein the intake-side inlet of the turbocharger is connected to an intake pipe which is curved into an L-shape and which has an upstream-side portion connected to the gas conduit and inclined upward, and the gas conduit is inclined upward from the blowby-gas discharge port to a connecting part at which the gas conduit and the intake pipe are connected to each other.

4. The engine device according to claim 1, wherein a gas introduction part, which is configured to introduce blowby gas in the rocker arm chamber upward into the positive crankcase ventilation device, is inserted into the rocker arm chamber, and an inner passage between a gas outlet of the gas introduction part and a gas discharge part communicating with the blowby-gas discharge port has a labyrinth structure.

5. The engine device according to claim 4, wherein the positive crankcase ventilation device includes a dividing wall which is disposed away from a peripheral wall of the positive crankcase ventilation device and which divides, from the inner passage, a gas introduction chamber to which the gas outlet of the gas introduction part is inserted, and an oil trap material is provided between the peripheral wall and the dividing wall to allow the oil trap material to be interposed between the gas outlet of the gas introduction part and the inner passage.

6. The engine device according to claim 5, wherein a beam-shaped dividing wall is provided in a suspended manner at a position between the oil trap material and the gas introduction chamber and above the oil trap material, and the inner passage includes, as a part thereof, a space surrounded by an upper surface of the oil trap material, the beam-shaped dividing wall, and the peripheral wall.

7. The engine device according to claim 1, wherein:
the turbocharger is positioned above the exhaust manifold, and
the turbocharger is supplied with a lubrication oil through an oil feeding pipe, the oil feeding pipe being installed such that the oil feeding pipe extends from the second one of the left and right side surfaces of the engine device toward the first one of the left and right side surfaces of the engine device, while making a detour by extending along a first one of front and rear side surfaces of the engine device, and the oil feeding pipe further extending, over the first one of the left and right side surfaces of the engine device, from a first one of front and rear side surfaces of the exhaust manifold toward a position above the exhaust manifold, while making a detour by extending along an outer periphery of the exhaust manifold.

8. The engine device according to claim 1, wherein:
an injector is inserted into the cylinder head, and is supplied with a fuel from a fuel injection pump device,
the fuel injection pump device has front and rear ends, a first one of which is provided with an electronically-controlled speed-governing mechanism, the first one of the front and rear ends of the fuel injection pump device is fixed to a second one of left and right side surfaces of the cylinder head via a fixing bracket, and a second one of the front and rear ends of the fuel injection pump device is fixed to a gear case attached to a cylinder block, and the injector is placed in a recess in the intake manifold, which is mounted on the upper surface of the cylinder head, and the injector is connected to the fuel injection pump device through a fuel pipe.

9. The engine device according to claim 1, wherein:

the intake-side inlet of the turbocharger is positioned to face a first one of front and rear side surfaces of the engine device, and an intake pipe, which is curved into an L-shape, has
- a downstream-side portion positioned along a front-and-rear direction of the engine device and connected to the intake-side inlet of the turbocharger, and
- an upstream-side portion positioned along a left-and-right direction of the engine device and extending toward the second one of the left and right side surfaces of the engine device.

10. A system comprising:

a cylinder head cover disposed on an upper surface of a cylinder head and integrally including a rocker arm chamber and an intake manifold, the cylinder head cover comprising:
- a wall dividing the rocker arm chamber and the intake manifold;
- a positive crankcase ventilation device in fluid communication with the rocker arm chamber; and
- a blow-by gas discharge port positioned on a side surface of the positive crankcase ventilation device and in fluid communication with the positive crankcase ventilation device, the blow-by gas discharge port configured to be coupled to a turbocharger.

11. The system of claim 10, wherein:

the intake manifold and rocker arm chamber are isolated from each other.

12. The system of claim 10, wherein:

the positive crankcase ventilation device is positioned on an upper surface of the cylinder head cover; and the positive crankcase ventilation device protrudes from the upper surface of the cylinder head cover.

13. The system of claim 12, further comprising:

the turbocharger configured to be coupled to the blow-by gas discharge port via a gas conduit.

14. The system of claim 10, wherein:

the cylinder head cover is positioned such that:
- the rocker arm chamber is positioned on a first side of the cylinder head cover, and
- the intake manifold is positioned on a second side of the cylinder head cover, the second side different from the first side.

15. The system of claim 14, further comprising:

an exhaust manifold; and wherein the turbocharger comprises a turbocharger gas inlet coupled to the exhaust manifold.

16. The system of claim 15, wherein:

the turbocharger is positioned above the exhaust manifold.

17. The system of claim 15, further comprising:

a cylinder block; and wherein the exhaust manifold is disposed on a first side surface of the cylinder block.

18. The system of claim 17, further comprising:

an oil feeding pipe configured to provide lubrication oil from the cylinder block to the turbocharger; and the oil feeding pipe extends from a second side surface of the cylinder block.

19. The system of claim 10, further comprising:

a fuel injection pump device, the fuel injection pump device comprising:
- an electronically-controlled speed governing mechanism positioned on a first side of the fuel injection pump device; and an injector positioned in a recessed portion on the upper surface of the cylinder head cover and configured to receive fuel from the fuel injection pump device.

20. The system of claim 19, wherein:

the first side of the fuel injection pump device is positioned on a first side surface of a cylinder head via a fixing bracket, and a second side surface of the fuel injection pump device is positioned on a first side of a gear case, the first side of the gear case corresponding with the first side surface of the cylinder head and the gear case positioned on a front side of a cylinder block.

\* \* \* \* \*